(12) United States Patent
Wang et al.

(10) Patent No.: US 9,062,163 B2
(45) Date of Patent: *Jun. 23, 2015

(54) HIGH TEMPERATURE POLYMER BLENDS OF POLY(ARYL ETHER KETONE PHTHALAZINONE)

(75) Inventors: Yi-Feng Wang, Clifton Park, NY (US); Tim Hsu, State College, PA (US); Allan S. Hay, Montreal (CA); Kun Li, State College, PA (US); Bhavin Patel, State College, PA (US)

(73) Assignee: Polymics, Ltd., State College, PA (US)

( * ) Notice: Subject to any disclaimer, the term of this patent is extended or adjusted under 35 U.S.C. 154(b) by 439 days.

This patent is subject to a terminal disclaimer.

(21) Appl. No.: 12/915,779

(22) Filed: Oct. 29, 2010

(65) Prior Publication Data

US 2011/0104417 A1    May 5, 2011

Related U.S. Application Data

(60) Provisional application No. 61/280,177, filed on Oct. 29, 2009.

(51) Int. Cl.
| | | |
|---|---|---|
| *C08L 61/34* | (2006.01) | |
| *C08G 73/18* | (2006.01) | |
| *C08G 65/40* | (2006.01) | |
| *C08G 73/06* | (2006.01) | |
| *C08G 73/10* | (2006.01) | |
| *C08L 71/00* | (2006.01) | |
| *C08L 79/04* | (2006.01) | |
| *C08L 79/08* | (2006.01) | |

(52) U.S. Cl.
CPC ............ *C08G 73/18* (2013.01); *Y10T 428/139* (2015.01); *C08G 65/4037* (2013.01); *C08G 73/0694* (2013.01); *C08G 73/1053* (2013.01); *C08G 2650/40* (2013.01); *C08L 71/00* (2013.01); *C08L 79/04* (2013.01); *C08L 79/08* (2013.01); *C08L 2205/02* (2013.01)

(58) Field of Classification Search
USPC .......................................................... 525/540
See application file for complete search history.

(56) References Cited

U.S. PATENT DOCUMENTS

| | | | |
|---|---|---|---|
| 3,065,205 A | 11/1962 | Bonner, Jr. | |
| 3,433,773 A | 3/1969 | Ohama et al. | |
| 3,441,640 A | 4/1969 | Santangelo | |
| 3,838,097 A | 9/1974 | Heath et al. | |

(Continued)

OTHER PUBLICATIONS

Meng, Y.Z. et al, Synthesis of Novel Poly(phthalazinone ether sulfone ketone)s and improvement of its Melt Flow Properties, J. Appl. Pol. Sci., 1997, 66: p. 1425-33.

Meng, Y.Z. et al, Synthesis and Properties of Poly(aryl ether sulfone)s Containing the Phthalazinone Moiety, J. Appl. Pol. Sci., 1998, 68: p. 137-45.

(Continued)

*Primary Examiner* — Mike M Dollinger
(74) *Attorney, Agent, or Firm* — GED Patents LLC; Gerald F. Dudding

(57) ABSTRACT

The present invention provides high temperature compositions comprising blends of a first polymer, poly(aryl ether ketone phthalazinone)s, and a second polymer, selected from poly(aryl ether ketone)s, poly(aryl ketone)s, poly(ether ether ketone)s, poly(ether ketone ketone)s, or polybenzimidazoles, thermoplastic polyimides, polyetherimides, poly(aryl ether sulfone)s, poly(phenylene sulfide)s, and mixtures thereof. The compositions have improved high temperature characteristics, e.g., improved high temperature load capability and improved high temperature melt processibility.

22 Claims, 8 Drawing Sheets

(56) References Cited

U.S. PATENT DOCUMENTS

| | | | |
|---|---|---|---|
| 3,875,116 | A | 4/1975 | Heath |
| 3,901,855 | A | 8/1975 | Arnold |
| 4,002,679 | A | 1/1977 | Arnold |
| 4,020,142 | A | 4/1977 | Davis et al. |
| 4,108,837 | A | 8/1978 | Johnson et al. |
| 4,175,175 | A | 11/1979 | Johnson et al. |
| 4,464,507 | A | 8/1984 | Ostlinning et al. |
| 4,624,997 | A * | 11/1986 | Robeson et al. ............... 525/471 |
| 4,861,537 | A | 8/1989 | Ward |
| 5,071,949 | A | 12/1991 | Nakamura et al. |
| 5,139,863 | A * | 8/1992 | Alvarez et al. ............. 428/297.4 |
| 5,237,062 | A | 8/1993 | Hay |
| 5,254,663 | A | 10/1993 | Hay |
| 6,228,970 | B1 | 5/2001 | Saviar |
| 6,828,414 | B2 | 12/2004 | Okamoto et al. |
| 7,696,298 | B2 * | 4/2010 | Hay et al. ...................... 528/211 |
| 7,772,361 | B2 * | 8/2010 | Klaehn et al. ................. 528/423 |
| 2007/0238853 | A1 | 10/2007 | Hay |
| 2008/0185751 | A1 * | 8/2008 | Dawkins et al. ......... 264/211.21 |
| 2010/0113688 | A1 | 5/2010 | Hsu |

OTHER PUBLICATIONS

Meng, Y.Z. et al, Morphology, rheological and thermal properties of the melt blends of poly(phthalazinone ether ketone sulfone) . . . , Polymer, 1998, 39: p. 1845-61.

Meng, Y.Z. et al, Synthesis and Thermal Properties of Poly(arylene ether ketone)s Containing Phthalazinone Moieties, J. Pol. Sci. Chem., 1999, 37: p. 1781-8.

Savariar, S. et al, Polysulfone with lower levels of cyclic dimer: Use of MALDI-TOF in the study of cyclic oligomers, Presented at ICOM, Toulouse, France, Jul. 7-12, 2002, p. 15-20.

Liao Gongxiong Jian Xigao, et al., "The Compatibility and Tensile Property of PPEKKPPEI Polyblend", Acta Polymerica Sinica, No. 3, Jun. 2002, pp. 394-397.

Gui-Mei Wang, Xi-Gao Jian and Ming-Shan Zhao, Phase Behavior and Properties of Poly(phthalazinone ether ketone) Modified by Poly(ether ether ketone) Oligomer, High Performance Polymers 2008 20: 241 originally published online Nov. 5, 2007, DOI: 10.1177/0954008307080411.

Ho, Wei, et al., Study on the Rheological Properties of PPEK/PPS Blends, Rhodia Engineering, 2002 30(8) 16-19.

* cited by examiner

HIGH TEMPERATURE POLYMER BLENDS OF POLY(ARYL ETHER KETONE PHTHALAZINONE)

CROSS-REFERENCE TO RELATED APPLICATIONS

The present patent application is a non-provisional application claiming priority from U.S. provisional application with Ser. No. 61/280,177, filed on Oct. 29, 2009, and entitled "HIGH TEMPERATURE POLYMER BLENDS OF POLY (ARYL ETHER KETONE PHTHALAZINONE)".

FIELD OF THE INVENTION

The present teachings relate generally to high temperature compositions that have improved high temperature characteristics. More specifically, the present teachings relate to high temperature compositions that have improved high temperature load bearing capability and improved high temperature melt processibility, and articles molded from them. Methods for making the compositions are also disclosed.

BACKGROUND

Crystalline poly(aryl ether ketone)s (PAEK) with high heat resistance and chemical resistance are highly desirable for the manufacture of molded articles for demanding automotive, aerospace, electronics and oil field applications. Poly(aryl ether ketone)s are important engineering resins because of their generally excellent properties such as good mechanical properties at elevated temperatures, exceptional chemical resistance against organic solvents and strong acids and bases, low wear rate, abrasion and fire resistance, and electrical insulating.

However, the relatively low glass transition temperatures ($T_g$) of these crystalline PAEK resins limit their use at high temperatures under load. This deficiency has been improved, but not solved, by the addition of reinforcement fillers such as, fiberglass, carbon fibers and ceramic or mineral fillers. Unfortunately, while reinforcement improves stiffness and strength, the compound still displays similar performance in long-term load performance. That is, the creep resistance and relaxation under stress still perform as if the material is un-reinforced. The addition of reinforcing fibers also increases weight, reduces flow and induces anisotropy in molded parts. Such anisotropy in a part may, for example, result in warp or other undesirable dimensional changes, such as curling in a film. In some instances the fiber additives can interfere with the surface smoothness of the shaped parts, causing uneven surface properties. This is especially true with respect to thin parts and films. The addition of reinforcing filler to PAEK resins will also make it difficult to extrude thin films and fibers. This is the main reason that the $T_g$ is the dominant factor for engineering polymer applications. The ability to increase $T_g$ through the use of blends is, therefore, a very valuable option.

Furthermore, the elongation to break is reduced significantly and processing characteristics are also adversely affected. Elongation to break or ductility is a critical requirement in many industrial applications requiring sealing and impact resistance.

Thus there exists a need for crystalline PAEK formulations with a range of improved properties, for instance load-bearing capabilities at high temperature, while maintaining good ductility and melt processability, thereby allowing for their improved use in molded articles, tubes, sheets, films and fibers.

SUMMARY OF THE INVENTION

Figure 1:
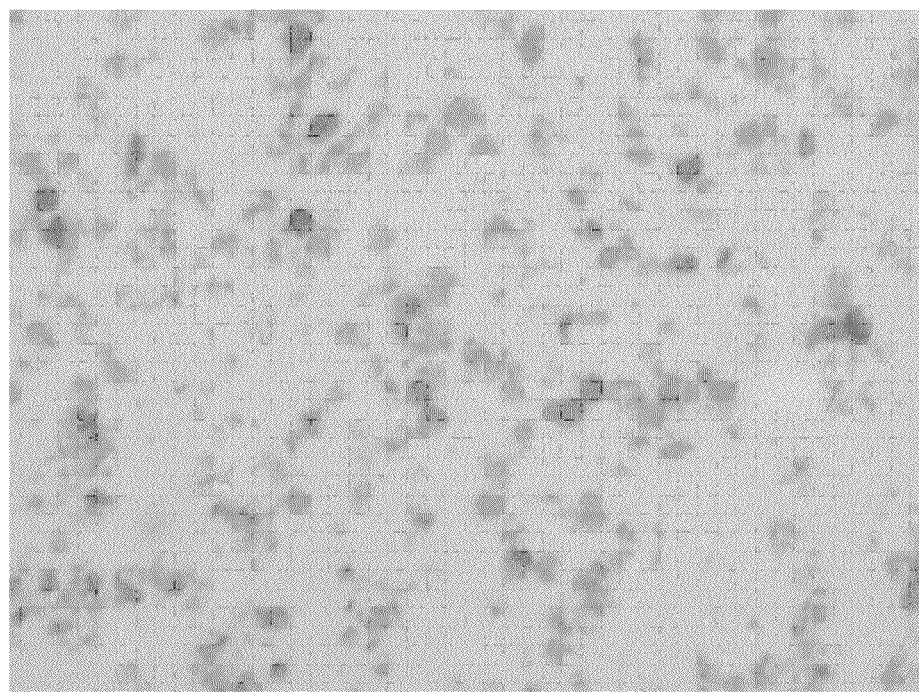
FIG. 1 depicts an optical micrograph of compression molded PEEK/PBI blend (50 wt % PEEK and 50 wt % PBI), in accordance with embodiments of the present invention.

A first aspect of the present invention provides a composition comprising a first polymer blend comprising a polymer selected from the group consisting of poly(aryl ether ketone phthalazinone)s and combinations thereof; and a second polymer blend comprising a polymer selected from the group consisting of poly(aryl ether ketone)s, thermoplastic polyimides, poly(aryl ether sulfone)s, polybenzimidazoles, poly (phenylene sulfide)s and combinations thereof.

A second aspect of the present invention provides a composition, comprising: about 1 part by weight to about 99 parts by weight of a first polymer component selected from the group consisting of poly(aryl ether ketone phthalazinone)s and mixtures thereof; and about 1 part by weight to about 99 parts by weight of a second polymer component selected from the group consisting of poly(aryl ether ketone)s, thermoplastic polyimides, poly(aryl ether sulfone)s, polybenzimidazoles, poly(phenylene sulfide)s and mixtures thereof.

A third aspect of the present invention provides a high temperature thermoplastic composition comprising a polymer blend, wherein the polymer blend is derived from mixing at least one poly(aryl ether ketone phthalazinone) and a polymer selected from the group consisting of a poly(aryl ether ketone), a polybenzimidazole, a thermoplastic polyimide, a poly(aryl ether sulfone), a poly(phenylene sulfide), and combinations thereof.

A fourth aspect of the present invention provides an article made from the high temperature compositions.

DETAILED DESCRIPTION OF THE EMBODIMENTS OF THE INVENTION

Blending polymers is an approach to achieving a plastic material with a desired set of physical properties such as improved heat resistance, load bearing capability at high temperature and improved melt processability.

Aromatic polybenzimidazoles are characterized by a high degree of thermal stability. They may be shaped to form fibers, films, and other articles of wide utility which show resistance to degradation by heat, hydrolytic media and oxidizing media. However, many of the polybenzimidazoles are not easily melt processable at desirably low temperatures and pressures. In particular, molded parts require a two-stage process involving cold compaction of PBI powders followed by heating at pressures of 1-3 Kpsi at 425-500° C. for a few hours.

Polymer blends may comprise miscible polymers, immiscible polymers, or a combination of miscible and immiscible polymers (or partially miscible polymers). Blends comprising immiscible polymers having two or more phases may be compatible or incompatible.

Miscible or partially miscible blends have improved load bearing capability at high temperature in the case of poly(aryl ether ketone), polyetherimide, poly(aryl ether sulfone) and poly(phenylene sulfide) and improved melt processability in the case of polybenzimidazoles. The improved loading bearing capability is characterized by the increase of onset temperature of storage modulus drop in a storage modulus-temperature curve of a polymer blend, and the improved melt processability is demonstrated by the ease of extrusion.

Incompatible blends of immiscible polymers can suffer from phase separation as demonstrated by delamination or the formation of skin-core layered structures during polymer processing operations, especially injection molding. The term "delamination," as used when referring to such materials, describes visually observed separation of a surface layer giving a flaking or onion skin effect. Incompatibility may also result in poor mechanical properties and marginal surface appearance (streaking, pearlescence, etc.).

FIG. 1 is an optical micrograph showing the phase separation of a blend of poly(ether ether ketone) (PEEK) (50 wt %) and PBI (50 wt %) where the distinctive PBI phase, shown as black or grey in the micrograph, remains as deformed particulates. The blend was powder mixed and then extruded with a twin screw extruder at 450° C., followed by compression molding. In this compatible but immiscible blend, PBI provides reinforcement to PEEK matrix at temperatures above its glass transition temperature.

Miscible polymer blends, offer additional desirable end-use properties and the advantage of tailoring product properties intermediate to the individual components across the miscible composition range. Miscible blends do not suffer from delamination as in incompatible blends and generally have uniform physical properties other than reinforcement provided by compatible blends.

Although a miscible blend of two or more polymers is generally desirable, it has been historically and consistently difficult to achieve. Blends of two or more polymers of the same or a similar class might be expected to have a better chance of miscibility. However, polymers from the same class are frequently immiscible and form multiphasic compositions. For example, ACUDEL® 2000 from Solvay Advanced Polymers LLC is an immiscible blend of two polysulfones (polyphenylenesulfone (PPSU) and polysulfone (PSU)). In addition, many such examples of immiscible blends of polymers in the same class exist in the literature. In the field of miscibility or compatibility of polymer blends, the art has found predictability to be unattainable, even though considerable work on the matter has been done. As stated by P. J. Flory (*Principles of Polymer Chemistry*, Cornell University Press, 1953, Chapter 13, p. 555): "It is well known that, regarding the mixing of thermoplastic polymers, incompatibility is the rule and miscibility or even partial miscibility is the exception. Since most thermoplastic polymers are immiscible with other thermoplastic polymers, the discovery of a homogeneous mixture or partially miscible mixture of two or more thermoplastic polymers is, indeed, usually unpredictable with any degree of certainty."

Thus, miscible polymer blends are not common, and are in fact exceptional from a polymer chemistry standpoint. The criteria for determining whether or not two polymers are miscible are now well established. One common method used for establishing miscibility in polymer-polymer blends or partial phase mixing in such blends is through determination of the glass transition (or transitions) in the blend versus those of the unblended constituents. A miscible polymer blend will usually exhibit a single glass transition $T_g$ between the $T_g$'s of the components. With cases of limited miscibility, two separate transitions $T_g^1$ and $T_g^2$ between those of the constituents may result, typically depicting two phases, a phase rich in the first component and a second phase rich in the second component.

The present teachings are directed to miscible or partially miscible polymer blends comprising a mixture of: a) a first polymer component comprising at least one poly(aryl ether ketone phthalazinone); and b) at least one second polymer component selected from one or more of the group comprising: a poly(aryl ether ketone), a polybenzimidazole, a polyetherimide, a poly(aryl ether sulfone), a poly(phenylene sulfide), and mixtures thereof.

In the context of the teachings herein, the second polymer component in the polymer blend is a polymer selected from the group PAEK including poly(aryl ether ketone)s, poly(aryl ketone)s, poly(ether ketone)s and poly(ether ether ketone)s. Any of the PAEK polymers can be used that will have improved properties through blending with a first polymer component according to the present teachings. The term poly (aryl ether ketone) (PAEK) as used herein is meant to include homopolymers, copolymers, terpolymers, graft copolymers, block copolymers, and the like, containing monomer units including one or more aryl groups, one or more ether groups and one or more ketone groups. Blends of one or more PAEK resins may also be used. Different types of PAEK resins include for example, poly(ether ketone) (PEK), poly(ether ether ketone) (PEEK), poly(ether ketone ether ketone ketone) (PEKEKK), poly(ether ketone ketone) (PEKK), and poly (ether ether ketone ketone) (PEEKK). PEEK resin is commercially available from Victrex Ltd. as VICTREX® PEEK, Solvay as KETASPIRE® and Evonik as VESTAKEEP®. PEKK resin is commercially available from Cytec Engineered Materials as CYPEK®. PEK resin is commercially available from Victrex Ltd as Victrex® PEEK-HT™, and PEKEKK resin is commercially available from Victrex Ltd as Victrex® PEEK-STT™.

Several PAEK polymers which are highly crystalline, with melting points above 300° C., can be used in the blends disclosed herein. Examples of these crystalline PAEK are shown in structures I, II, III, IV and V below.

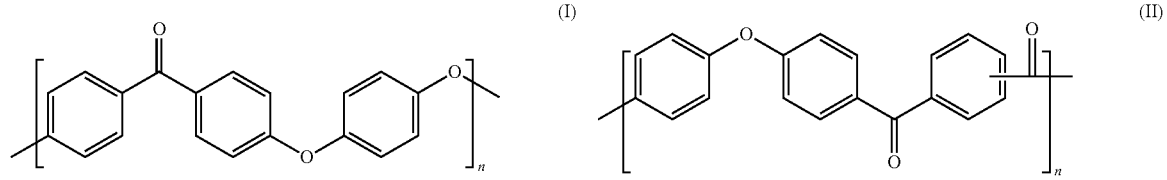

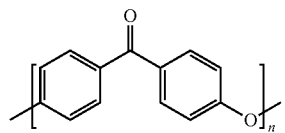 (III)

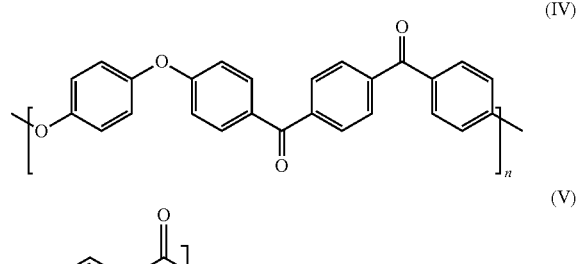 (IV)

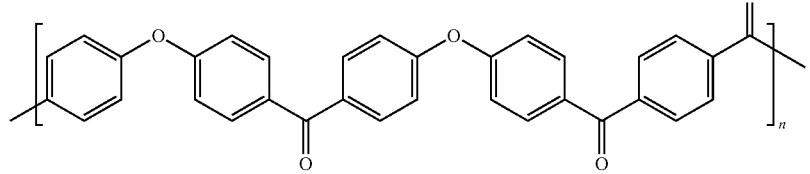 (V)

The skilled artisan will understand that there is a well developed and substantial body of patent and other literature directed to the formation and properties of PAEK. For example, some of the early work, such as U.S. Pat. No. 3,065,205, involves the electrophilic aromatic substitution (e.g., Friedel-Crafts catalyzed) reaction of aromatic diacyl halides with unsubstituted aromatic compounds such as diphenyl ether. It was later shown in U.S. Pat. No. 4,175,175 that a broad range of polymers can be formed, for example, by the nucleophilic aromatic substitution reaction of an activated aromatic dihalide and an aromatic diol or salt thereof.

PAEK can be prepared by any appropriate method. One such method comprises heating a substantially equimolar mixture of at least one bisphenol, generally reacted as its bisphenolate salt and at least one of either a dihalobenzoid compound or, in other cases, at least one halophenol compound may be reacted to form polymer. In other instances, mixtures of these compounds may be used. For example hydroquinone can be reacted with a dihalo aryl ketone, such as 4,4'-dichlorobenzophenone or 4,4'-difluorobenzophenone to form a poly(aryl ether ketone). In other cases a dihydroxyaryl ketone, such as 4,4'-dihydroxybenzophenone can be polymerized with activated aryl dihalides such as 4,4'-dichlorobenzophenone to form PAEK polymer. In still other instances dihydroxyarylethers, such as 4,4'-dihydroxydiphenyl ether can be reacted with activated dihaloaryl ketones, such a 4,4'-difluorobenzophenone. In other variations dihydroxy compounds with no ether linkages, such as 4,4'-dihydroxybiphenyl or hydroquinone may be reacted with dihalo compounds which may have both ether and ketone linkages, e.g., 4,4'-bis-(dichloro benzoyl)diphenyl ether. In other instances diaryl ether carboxylic acids, or carboxylic acid halides can be polymerized to form poly(aryl ether ketone)s.

Examples of such compounds are 4-phenoxyphenylcarboxylic acid, 4-phenoxyphenyl carbonyl chloride, 4-(4-phenoxyphenoxy)benzoic acid, or mixtures thereof. In still other instances, dicarboxylic acids or dicarboxylic acid halides can be condensed with diaryl ethers. For instance iso or terephthaloyl chlorides (or mixtures thereof) can be reacted with diphenyl ether, to form PAEK polymers. The PAEK may have an inherent viscosity of at least about 0.4 to about 5.0 dL/g, as measured in concentrated sulfuric acid at 25° C.

In the context of the present teachings, as used herein and in the appended claims, the singular forms "a", "an", and "the" include plural referents unless the context clearly dictates otherwise.

In the context of the present teachings, the second polymer component in the polymer blend may also be another polymer selected from aromatic polybenzimidazoles (PBI). Aromatic PBI is commercially available from PBI Performance Products Inc as CELAZOLE® PBI polymer and has a general structure VI:

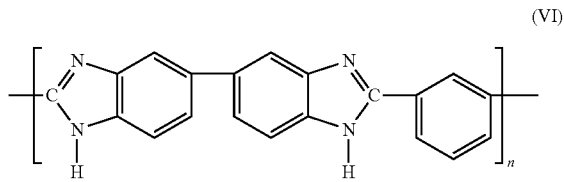 (VI)

Processes for the preparation of aromatic polybenzimidazoles are described in a number of U.S. Pat. Nos. 3,901,855; 4,002,679; 3,433,772; 3,441,640; and 4,020,142.

In the context of the present teachings, the second polymer component in the polymer blend may be another polymer selected from aromatic polyetherimide (PEI) and copolymers. Aromatic polyetherimide is commercially available from SABIC Innovative Plastics as ULTEM® 1000 and ULTEM® XH6050 and has a general structure VII:

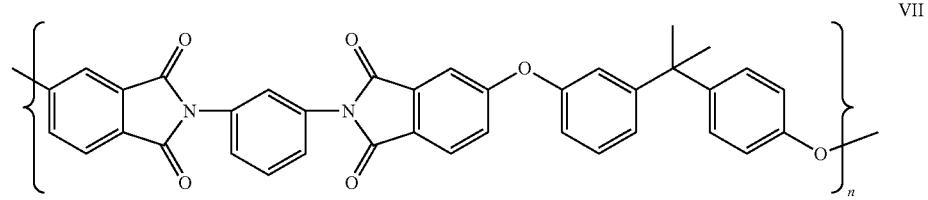 VII

Processes for the preparation of aromatic polyetherimide are described in a number of U.S. Pat. Nos. 3,838,097 and 3,875,116.

In the context of the present teachings, the second polymer component in the polymer blend may be another polymer selected from poly(aryl ether sulfone) such as poly(phenylene sulfone) (PPSU) and copolymers. Poly(aryl ether sulfone) is commercially available from Solvay Advanced Polymers LLC as RADEL® 5000 and has a general structure VIII:

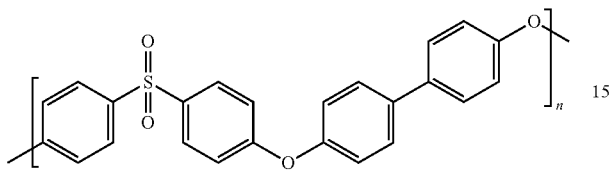

VIII

Processes for the preparation of poly(aryl ether sulfone) are described in a number of U.S. Pat. Nos. 4,108,837 and 6,228,970.

In the context of the present teachings, the second polymer component in the polymer blend may be another polymer selected from poly(arylene sulfide) and copolymers. Poly(phenylene sulfide) is commercially available from Ticona as FORTRON® PPS and has a general structure IX:

IX

Processes for the preparation of poly(arylene sulfide) are described in a number of U.S. Pat. Nos. 4,464,507 and 5,071,949.

In the context of the present teaching, the first polymer component is poly(aryl ether ketone phthalazinone) (PAEKP) resins, and mixtures of. As used herein the PAEKP is described below, and comprises structural units having the general formula (X):

(X)

wherein $0 \leq y \leq 1.00$ and $x+y=1$, and Cp is a phthalazinone radical of formula (XI),

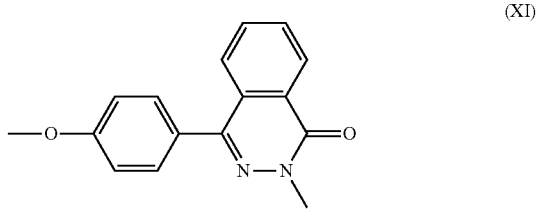

(XI)

Q is a Bisphenol radical of formula (XII)

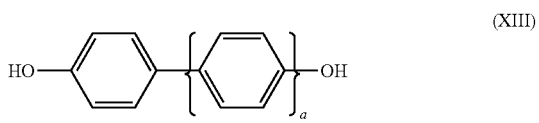

(XIII)

where a equals 0 or 1 in formula (XIII)

Z is a bisphenylketone radical of formula (XIV)

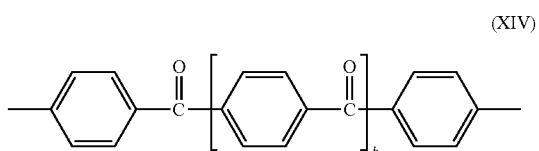

(XIV)

where b equals 0 or 1 in formula (XIV)

or a biphenyldiketone radical of formula (XV):

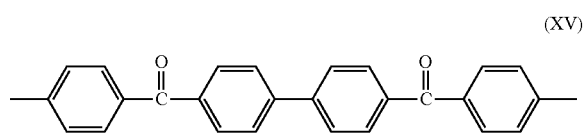

(XV)

Examples of these PAEKP are shown in structures XVI, XVII, XVIII, XIX, and XX below.

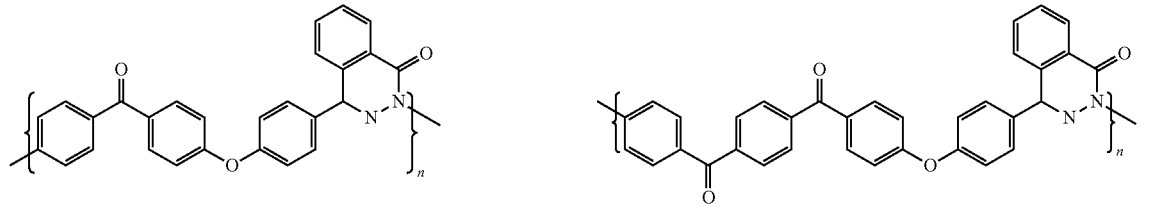

(XVI)                                                    (XVII)

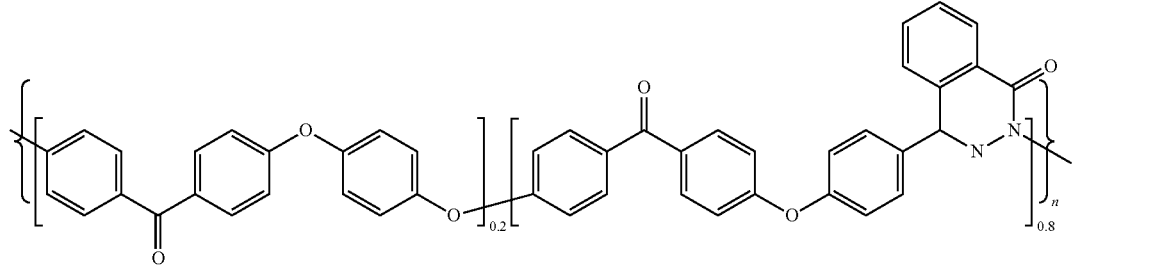

(XVIII)

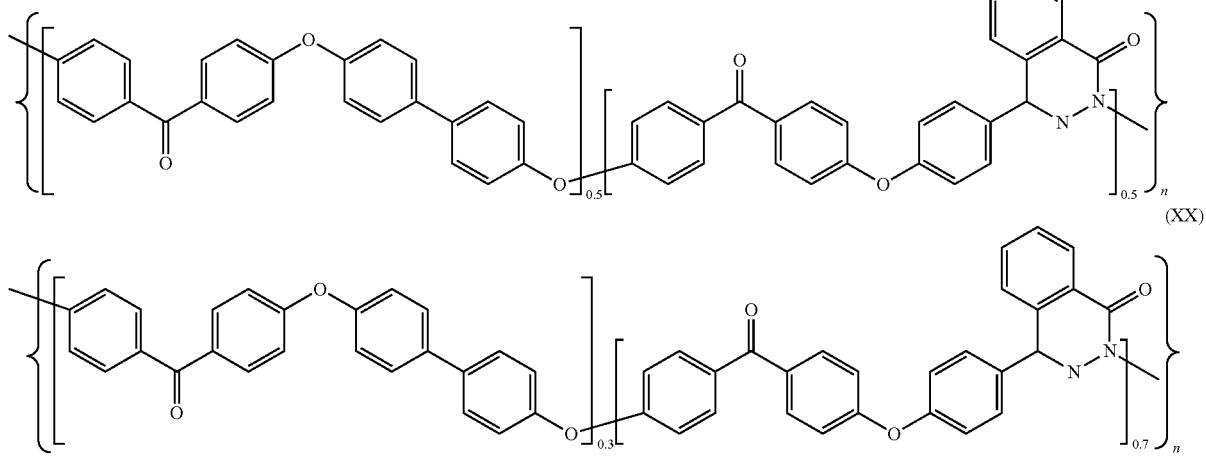

Poly(aryl ether ketone phthalazinone) (PAEKP) may have a melt index of 0.1 to 200 grams per 10 minute (g/10 min), as measured by the American Society for Testing Materials (ASTM) DI238 at 340-400° C. In one claim, the PAEKP polymer has an inherent viscosity of 0.3 to 2.0 dL/g at 30° C. in 98% sulfuric acid. In another claim, the PAEKP has an inherent viscosity of 0.5 to 1.0 dL/g at 30° C. in 98% sulfuric acid.

In the context of the present teachings, the term "polymer blend" as used herein means a macroscopically homogeneous mixture of two or more different polymers. The term "miscible blend" describes a polymer blend having a single glass transition temperature ($T_g$). The term "partially miscible blend" describes a polymer blend having more than one glass transition temperature ($T_g$), and shows multiphasic resin morphologies when viewed by electron microscopy but shows no delamination.

As used herein, "miscible" refers to a blend that exhibits a single glass transition temperature between the $T_g$'s of the components.

As used herein, "partially miscible" refers to two separate glass transitions between those of the constituents, depicting a component 1-rich phase and a component 2-rich phase.

As used herein, the term "improved load bearing capability" refers to the load bearing capability of the polymer blend composition being improved compared to the load bearing capability of the first or second polymer having the lower $T_g$.

As used herein, the term "improved melt processibility" refers to the melt processibility of the polymer blend composition comprising the first polymer and second polymer being improved compared to the melt processibility of the first or second polymers having the higher $T_g$.

The PAEK-PAEKP blends can be completely miscible with a single $T_g$.

The PBI-PAEKP blend is completely miscible with single $T_g$ or may show partial miscibility with two $T_g$'s but exhibits macroscopically uniform physical properties.

The PEI-PAEKP blend is completely miscible with single $T_g$.

The PPSU-PAEKP blend is completely miscible with single $T_g$ or may show partial miscibility with two $T_g$'s but exhibits macroscopically uniform physical properties.

The PPS-PAEKP blend is partially miscible with two $T_g$'s but exhibits macroscopically uniform physical properties.

The ratio of first polymer component to second polymer component in the polymer blend can be any that results in a polymer blend that has improved properties than either component alone.

The ratio, in parts by weight, may range anywhere from 1:99 to 99:1, depending on the end use application, and the desired property to be improved. The range of ratios can also be from 20:80 to 80:20 or anywhere from 30:70 to 70:30. Depending on the application, the ratio can be also from 40:60 to 60:40. These ranges are inclusive of all the values between their upper and lower bounds or limits. The skilled artisan will appreciate that changing the ratios of the first polymer component to the second polymer component can fall to any real number ratio within the recited ranges depending on the selected result.

The properties of the final polymer blend, which can be adjusted by changing the ratios of ingredients, include glass transition temperature, heat distortion temperature, load bearing capability and melt processability. For example, in one embodiment, the PAEKP polymer can be present in any amount effective to improve, by increasing, the load bearing capability of the PAEK-PAEKP blends over the individual PAEK components themselves. In some instances, the PAEK polymer can be present from 5 to 95 wt % of the entire mixture while the PAEKP varies from 95 to 5 wt %. In another embodiment, the PAEKP polymer can be present in any amount effective to improve the melt processability of the PBI-PAEKP blends over the individual PBI components themselves. In some instances, the PBI polymer can be present in 1 to 80 wt % of the entire mixture while the PAEKP varies from 99 to 20 wt %.

The compositions described herein may further contain fillers, reinforcements, additives, and combinations thereof. Exemplary fillers and reinforcements include fiber glass, milled glass, glass beads, flake, carbon fiber and nanotubes, aramid fiber, metal fibers, metal powders, conductive carbon and the like. Minerals such as talc, wollastonite, mica, kaolin or montmorillonite clay, silica, quartz, barite, and combinations of two or more of the foregoing can also be added.

Filled polymer blends according to the present teachings may be made by mixing in the molten state, an amount of: a) a first polymer component comprising a poly(aryl ether ketone phthalazinone) (PAEKP); with, b) a second polymer component selected from one or more of the group including a poly(aryl ether ketone), a polybenzimidazole, a polyetherimide, a poly(aryl ether sulfone), a poly(phenylene sulfide), and mixtures thereof, and articles molded from them; and c) at least one filler. The three components may be mixed by any method that will result in a filled blend according to the teachings herein. Such methods include extrusion, sintering and the like.

The compositions of the present teachings can also be combined with various additives including, but not limited to, colorants such as titanium dioxide, zinc sulfide and carbon black; stabilizers such as hindered phenols, phosphites, phosphonites, thioesters and mixtures thereof, as well as mold release agents, lubricants, metal deactivators, plasticizers, nucleating agents such as talc, wear resistant additives, such as fluoro polymers and metal sulfides, smoke suppressors and anti-drip agents such as those based on fluoro polymers. Use of phosphonate or phosphite compounds or mixtures thereof may be desired in some instances to improve color and stability. In another instances, aryl phosphonate, phosphite compounds or mixtures thereof or in combination with hindered phenol antioxidants can be employed. Ultraviolet light stabilizers can also be added to the compositions in effective amounts.

Effective amounts of the additives and/or fillers vary widely, but they are usually present in an amount up to about 0.01-40% or more by weight, based on the weight of the entire composition and the type of additive and/or fillers used.

The composition of the present teachings can be fabricated into any desired shape such as moldings, films, coatings or fibers. Preferred methods include, for example, injection molding, blow molding, compression molding, profile extrusion, sheet or film extrusion, sintering, gas assist molding, structural foam molding and thermoforming. The polymer blends can advantageously be used for those applications which require a combination of good electrical insulating properties, good resistance to a wide range of chemicals, retention of mechanical properties at high temperatures, good resistance to burning with low emission of toxic fumes, and low smoke density on burning. Examples of such articles include, but are not limited to, seals, back up rings, CMP rings, medical devices, trays, plates, electrical connectors, enclosures for electrical equipment, engine parts, automotive engine parts, bearings, lighting sockets and reflectors, electric motor parts, power distribution equipment, communication equipment and the like. The blends can also be used as fibers. In addition, the blends can be used as coatings, for example, powder coatings. The blends can also be extruded into rods and slabs that can be used to form articles by machining.

The following examples are included to provide additional guidance to those skilled in the art of practicing the teachings herein. The examples provided are merely representative of the present teachings. Accordingly, these examples are not intended to limit the invention in any manner.

All patents and/or patent applications cited herein are incorporated by reference in their entirety as though set forth fully herein.

PAEKP EXAMPLES

The PAEKP materials utilized in the blended polymers of the present teachings are either amorphous polymers or semicrystalline polymers. The semicrystalline PAEKP polymers are themselves novel. The incorporation of 4,4'-biphenol as a comonomer unit into poly(aryl ether ketone phthalazinone) containing a phthalazinone monomer, as described, unexpectedly results in a melt processable semicrystalline polymer with a $T_g$>180° C. that is not soluble in organic solvents such as chloroform. Even with the incorporation of 4,4'-biphenol as low as 30 mol %, the resulting poly(aryl ether ketone phthalazinone) is still semicrystalline with a $T_g$ of 230° C., a melt temperature of 316° C., and a melting endotherm of 5.0 J/g. Given the relatively small amount of the 4,4'-biphenol comonomer incorporated, such a result is entirely unexpected. Advantageously, this polymer is not soluble in chloroform, and compression molded film has good resistance to organic solvents.

Semicrystalline poly(aryl ether ketone phthalazinone) with a high glass transition temperature ($T_g$) (>180° C.) can be prepared by polymerization of 4,4'-difluorobenzophenone with 4,4'-biphenol and 4-(4-hydroxyphenyl)phthalazin-1 (2H)-one (phthalazinone). These polymers can be processed via melt processes such as extrusion and injection molding. The present teachings comprise, but are not limited to, the following:

Semicrystalline poly(aryl ether ketone phthalazinone) containing 4,4'-biphenol and a phthalazinone comonomer unit.

Semicrystalline poly(aryl ether ketone phthalazinone) containing a B/P ratio of between about 30/70 and about 90/10.

Semicrystalline poly(aryl ether ketone phthalazinone) having a $T_g$ from about 185° C. to about 240° C.

Semicrystalline poly(aryl ether ketone phthalazinone) having a melting temperature (Tm) from about 310° C. to about 380° C.

Semicrystalline poly(aryl ether ketone phthalazinone) containing a phthalazinone comonomer unit that can be melt processed via common techniques such as extrusion or injection molding.

The $T_g$ and melting temperature of semicrystalline poly (ether ketone phthalazinone)s can be adjusted with varying levels of incorporation of 4,4'-biphenol monomer, and high $T_g$ semicrystalline copolymers are thereby obtained. Examples are set forth below.

The glass transition temperature ($T_g$), melting temperature ($T_m$), and enthalpy of melting endotherm ($\Delta H_m$) of each polymer was measured by Differential Scanning calorimetry (DSC) using a TA Instruments Q-10 or Q-100 DSC machine with a heating rate of 20° C./minutes. The inherent viscosity of each polymer was measured at 30° C. on a solution of 0.5 g of polymer in 100 cm³ of solution in 98% sulfuric acid.

Incorporation of the biphenyl unit, by substituting 4,4'-biphenol for a portion of the phthalazinone in poly(aryl ether ketone phthalazinone) with a phthalazinone unit results in high molecular weight semicrystalline polymers with good ductility, which retain high melting temperatures, and which can be further prepared at reaction temperatures of about 360° C. or less. Due to the consistent limitations of the art and the molecular size and orientation of 4,4'-biphenol, the commercially desirable properties of the polymers described herein are neither anticipated nor expected.

The polymers of the present teachings have high melting temperatures of about 310° C. or above and 380° C. or less, glass transition temperatures of about 185° C. to 240° C., moderate to good crystallinity that is measured as enthalpy of melting endotherm of the polymers from about 5 J/g to about 26 J/g, and which can be synthesized with a high molecular weight that is measured as inherent viscosity (IV) of at least 0.7 or higher.

Amorphous poly(aryl ether ketone phthalazinone) with a high glass transition temperature ($T_g$) (>230° C.) can also be prepared by polymerization of 4,4'-difluorobenzophenone with 4,4'-biphenol and 4-(4-hydroxyphenyl)phthalazin-1 (2H)-one (phthalazinone). These polymers can be processed via melt processes such as extrusion and injection molding. The present teachings comprise, but are not limited to, the following:

Amorphous poly(aryl ether ketone phthalazinone) containing 4,4'-biphenol and a phthalazinone comonomer unit.

Amorphous poly(aryl ether ketone phthalazinone) containing a B/P ratio of between about 0/100 and about 29/71.

Amorphous poly(aryl ether ketone phthalazinone) having a $T_g$ from about 230° C. to about 257° C.

The novel poly(aryl ether ketone phthalazinone) of the present teachings can be characterized as containing the following aryletherketone repeating units, represented by structures XXI and XXII:

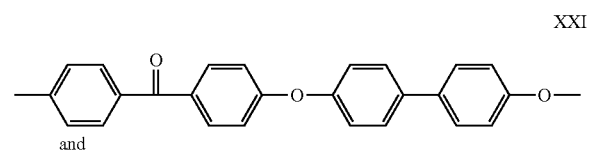

XXI and

XXII

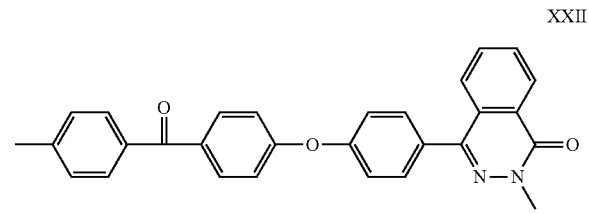

The starting monomers which are used to prepare the poly (aryl ether ketone phthalazione)s of the present teachings comprise, for example, the following units:

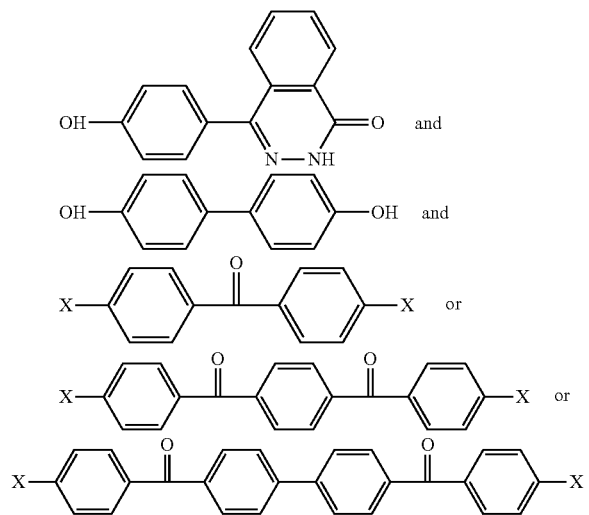

where X is fluorine or chlorine.

In various claims of the present teachings, the amount of biphenol to prepare the copolymers herein is such that the molar ratio (B/P) of co-monomer biphenol (B) to phthalazinone (P) is from about 0/100 to 90/10. In some claims, the molar ratio is from 30/70 to about 90/10. In some claims, the molar ratio is from about 35/65 to about 80/20. In some claims, the molar ratio is from about 40/60 to about 70/30, such that the resulting copolymer has a $T_g$ greater than about 180° C., a $T_m$ greater than about 310° C. and less than about 380° C., and an $\Delta H_m$ of at least about 5.0 J/g or higher.

In various claims of the present teachings, a melt processable polymer comprises an inherent viscosity (IV) of not more than about 2.0 dL/g. In some claims, the IV is not more than about 1.5. In some claims, the IV is not more than about 1.2. For ease of processing, the IV comprises a range of at least about 0.2 to about 1.1 dL/g. The lower range can be increased to at least 0.7 during processing.

Some examples of melt processable semicrystalline polymers according to the present teachings are characterized by one or more of the following properties: (1) being semicrystalline with a $\Delta H_m$ of at least about 5.0 J/g and in some claims about 15 J/g or higher, (2) being ductile when compression molded into a film, (3) being resistant to a wide range of organic solvents, and being "essentially unaffected" after immersion for 24 hours in chloroform at 25° C., without gaining more than about 10% by weight, and (4) having a $T_g$ equal to or greater than about 180° C., and a $T_m$ equal to or less than about 380° C. Because of their unique properties, the polymers of the present teachings are particularly useful for applications that require resistance to both high temperatures and to organic solvents.

The PAEKP polymers according to the present teachings can be fabricated into any desired shape such as, for example, moldings, films, coatings or fibers. In particular, the polymers are useful for those applications which require a combination of good electrical insulating properties, good resistance to a wide range of chemicals, retention of mechanical properties at high temperatures, good resistance to burning with low emission of toxic fumes, and low smoke density on burning.

The PAEKP polymers of the present teachings can also include and/or incorporate mineral fillers (e.g. mica, glass, quartz, clay) as well as various fibers (e.g. glass fibers, carbon fibers, polyarylamide fibers, ceramic fibers). The polymers can additionally comprise additives such as colorants, pigments, thermal stabilizers, and ultra violet stabilizers.

The PAEKP polymers can be melt blended with one or more other polymers which include but are not limited to polybenzimidazole, polyarylamide, polysulfones, polyketones, polyimides, polyetherimides, polysulfoneimide, polyphenylene sulfides, fluoropolymers, polyesters and polycarbonates.

The technical approach to semicrystalline PAEKP polymerization of the present teachings differs significantly from the art, including U.S. Pat. No. 5,254,663 to Hay. In contrast to the art, the polymerization herein is carried out in a non-polar solvent, and the resulting polymers are semicrystalline. Moreover, the use of 4,4'-biphenol as a comonomer is not reported in the art. In addition, the present teachings disclose polymerization reactions conducted at significantly higher temperatures, generally between about 280° C. and about 320° C. In contrast, polymers containing a phthalazinone moiety currently reported in the art are processed at temperatures of 225° C. or less. These differences in polymerization methods and processes are novel.

B. Preparation

The PAEKP polymers of the present teachings can be prepared in solution by heating the monomers with alkali metal carbonate or a mixture of alkali metal carbonates. The alkali metal carbonates are typically sodium carbonate, potassium carbonate or a mixture of sodium carbonate, potassium carbonate and cesium carbonate.

The alkali metal carbonates can be anhydrous, if hydrated salts are employed, where the polymerization temperature is less than about 250° C. Water can be removed, e.g. by heating under reduced pressure or dehydration via azeotropic distillation with organic solvent such as toluene or o-dichlorobenzene, prior to reaching the polymerization temperature.

Where the PAEKP polymerization temperature is greater than 250° C., such as 270° C., it is not necessary to dehydrate the carbonate first, as any water is driven off rapidly before it can adversely affect the polymerization reaction.

The total amount of alkali metal carbonate used can be such that there is at least 1 atom of alkali metal for each phenol OH or phthalazinone NH group. An excess of alkali metal carbonate can be employed, and there may be 1 to 1.2 atoms of alkali metal per phenol OH or phthalazinone NH group.

In various claims of the present teachings, the PAEKP polymerization is carried out in an inert solvent such as diphenyl sulfone and benzophenone. In some claims, the polymerization is carried out at temperatures from about 200° C. to about 400° C. In some claims, the polymerization temperature is above about 260° C. The reactions are generally performed under atmospheric pressure; however, the reactions can also be performed at higher or lower pressures.

For preparation of some PAEKP polymers, it may be desirable to commence polymerization at one temperature, e.g. between about 180° C. and about 250° C., and then increase the temperature as polymerization ensues. This is particularly advantageous when fabricating polymers having only a low solubility in the solvent. Thus, it is desirable to increase the temperature progressively to maintain the polymer in solution as its molecular weight increases. In some claims, the process comprises an elevated temperature of about 180° C. to about 360° C. In other claims, the process comprises an elevated temperature of about 220° C. to about 340° C. In order to minimize degradation reactions in some claims, the maximum polymerization temperature can be below 360° C.

The following examples are illustrative of the PAEKP polymers of the present teachings, and are not intended in any way to limit their scope.

C. Examples

Preparation of Semicrystalline and Amorphous Poly(aryl ether ketone phthalazinone) from 4,4'-Biphenol and Phthalazinone Monomer Example 1

Semicrystalline Copolymer with Molar Ratio of 4,4'-Biphenol and Phthalazinone B/P=30/70

To a 250 mL three-neck round-bottomed flask, equipped with a nitrogen inlet, thermocouple, mechanical stirrer, Dean-Stark trap and condenser, 21.82 grams (100.0 mmol) of dried 4,4'-difluorobenzophenone, 16.76 grams (70.0 mmol) of dried phthalazinone monomer, 5.59 grams (30.0 mmol) of dried 4,4'-biphenol and 14.65 grams (106.0 mmol) of anhydrous potassium carbonate were charged. Diphenyl sulfone (132.5 grams) and chlorobenzene (30.0 ml) were then added. The reaction medium was heated to 170° C., and chlorobenzene was distilled to remove water over one hour. The reaction mixture was then heated to 200° C. and maintained for two hrs. The reaction mixture was further heated to 300° C. and maintained for four hrs. The reaction was terminated, and the mixture was cast into sheet on a glass surface in a glass tray and cooled to room temperature. The cooled solid was then hammer milled to fine particles less than about 60 mesh.

The fine particles were placed into a flask with 500 ml acetone, heated under reflux for one hour, and then filtered. This process was repeated five times to remove diphenylsulfone. The resulting powder material was then placed into a flask with 500 ml de-ionized water, heated under reflux for one hour, and then filtered. This process was repeated five times to remove inorganic salts.

The resulting solid polymer was then dried at 120° C. under vacuum overnight. The white polymer has an inherent viscosity (IV) of about 0.78 dL/g (0.5 g/dL solution of the polymer in 98% sulfuric acid at 30° C.), a glass transition temperature of about 230° C., a melting temperature of about 316° C. and a melting endotherm of about 5.0 J/g. The polymer is insoluble in chloroform, dimethylformamide (DMF) and N-cyclohexylpyrrolidinone (CHP).

The powdered polymer was compression molded at 375° C. for five minutes to give a tough opaque film. A sample of film immersed in chloroform at 25° C. for 24 hours showed a weight increase of 1.8%. The film remained resistant with no visible effects of attack by chloroform.

Example 2

Semicrystalline Copolymer with Molar Ratio of 4,4'-Biphenol and Phthalazinone B/P=40/60

A copolymer with a 40/60 molar ratio of 4,4'-biphenol and phthalazinone monomer was prepared according to the procedure described in Example 1. The resulting polymer has an inherent viscosity (IV) of about 0.74 dL/g, a glass transition temperature of about 225° C., a melting temperature of about 336° C. and a melting endotherm of about 8.0 J/g. The polymer is insoluble in chloroform, dimethylformamide (DMF) and N-cyclohexylpyrrolidinone (CHP).

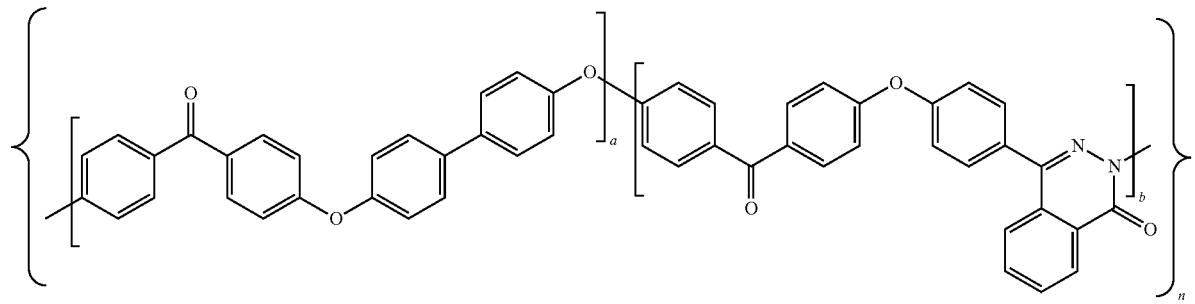

Example 3

Semicrystalline Copolymer with Molar Ratio of 4,4'-Biphenol and Phthalazinone B/P=60/40

A copolymer with a 60/40 molar ratio of 4,4'-biphenol and phthalazinone monomer was prepared according to the procedure described in Example 1. The resulting polymer has an inherent viscosity (IV) of about 0.79 dL/g, a glass transition temperature of about 204° C., melting temperature of about 357° C. and a melting endotherm of about 16.0 J/g. The polymer is insoluble in chloroform, dimethylformamide (DMF) and N-cyclohexylpyrrolidinone (CHP).

Example 4

Semicrystalline Copolymer with Molar Ratio of 4,4'-Biphenol and Phthalazinone B/P=65/35

A copolymer with a 65/35 molar ratio of 4,4'-biphenol and phthalazinone monomer was prepared according to the procedure described in Example 1. The resulting polymer has an inherent viscosity (IV) of about 1.48 dL/g, a glass transition temperature of about 205° C., a melting temperature of about 347° C. and a melting endotherm of about 14.0 J/g. The polymer is insoluble in chloroform, dimethylformamide (DMF) and N-cyclohexylpyrrolidinone (CHP).

Example 5

Semicrystalline Copolymer with Molar Ratio of 4,4'-Biphenol and Phthalazinone B/P=70/30

A copolymer with a 70/30 molar ratio of 4,4'-biphenol and phthalazinone monomer was prepared according to the procedure described in Example 1. The resulting polymer has an inherent viscosity (IV) of about 0.75 dL/g, a glass transition temperature of about 200° C., a melting temperature of about 368° C. and a melting endotherm of about 25.0 J/g. The polymer is insoluble in chloroform, dimethylformamide (DMF) and N-cyclohexylpyrrolidinone (CHP).

Example 6

Semicrystalline Copolymer with Molar Ratio of 4,4'-Biphenol and Phthalazinone B/P=75/25

A copolymer with a 75/25 molar ratio of 4,4'-biphenol and phthalazinone monomer was prepared according to the procedure described in Example 1. The resulting polymer has an inherent viscosity (IV) of about 0.73 dL/g, a glass transition temperature of about 190° C., a melting temperature of about 376° C. and a melting endotherm of about 26.0 J/g. The polymer is insoluble in chloroform, dimethylformamide (DMF) and N-cyclohexylpyrrolidinone (CHP).

Example 7

Semicrystalline Copolymer with Molar Ratio of 4,4'-Biphenol and Phthalazinone B/P=80/20

A copolymer with an 80/20 molar ratio of 4,4'-biphenol and phthalazinone monomer was prepared according to the procedure described in Example 1. The resulting polymer has an inherent viscosity (IV) of about 0.95 dL/g, a glass transition temperature of about 185° C., a melting temperature of about 367° C. and a melting endotherm of about 24.0 J/g. The polymer is insoluble in chloroform, dimethylformamide (DMF) and N-cyclohexylpyrrolidinone (CHP).

Example 8

Amorphous Copolymer with Molar Ratio of 4,4'-Biphenol and Phthalazinone B/P=20/80

A copolymer with a 20/80 molar ratio of 4,4'-biphenol and phthalazinone monomer was prepared according to the procedure described in Example 1. The resulting amorphous polymer has an inherent viscosity (IV) of about 1.02 dL/g (0.5 g/dL solution of polymer in chloroform at 25° C.) and a glass transition temperature of about 240° C. The polymer is soluble in chloroform, dimethylformamide (DMF) and N-cyclohexylpyrrolidinone (CHP) at room temperature.

Example 9

Amorphous Copolymer with Molar Ratio of 4,4'-Biphenol and Phthalazinone B/P=25/75

A copolymer with a 25/75 molar ratio of 4,4'-biphenol and phthalazinone monomer was prepared according to the procedure described in Example 1. The resulting amorphous polymer has an inherent viscosity (IV) of about 0.78 dL/g (0.5 g/dL solution of the polymer in 98% sulfuric acid at 30° C.), and a glass transition temperature of about 232° C. The polymer is insoluble in chloroform, dimethylformamide (DMF) and N-cyclohexylpyrrolidinone (CHP) at room temperature.

The section headings used herein are for organizational purposes only and are not to be construed as limiting the subject matter described in any way.

While the present teachings are described in conjunction with various claims, it is not intended that the present teachings be limited to such claims. On the contrary, the present teachings encompass various alternatives, modifications, and equivalents, as will be appreciated by those of skill in the art.

Blend Examples

Blends are prepared by compounding mixtures of PAEK (PEEK, PEKK and PEK) with PAEKP, as described herein, and mixtures of PBI with PAEKP, mixtures of PEI with PAEKP, mixture of PPSU with PAEKP, and mixtures of PPS with PAEKP in a single or twin screw extruder. Compositions are listed in wt % of the total composition. The extruder maximum barrel temperatures were set from 350 to 400° C. for the single screw extruder and from 360 to 400° C. for the twin screw extruder. The blends were run at 10-30 rpm on the single screw extruder and 250 rpm with the twin screw extruder under vacuum using mild mixing screws. The extrudate was cooled, pelletized and dried at 150-200° C.

Thermal properties of the blends were measured using Differential scanning calorimetry (DSC) method. DSC was run as per ASTM method D3418 using a TA Instruments Q-10 DSC machine with 10° C./min heating and cooling rates. Samples were heated at 10° C./min to 400° C., held at 400° C. for 5 minutes, and cooled at 10° C./min to 80° C. to record glass transition temperature ($T_g$), melting peak temperature ($T_m$) and peak crystallization temperature ($T_{cc}$).

The glass transition temperature of miscible polymer blends can also be estimated using the Mixture Rule-Fox Equation:

$$1/T_g = w_1/T_g^1 + w_2/T_g^2$$

where $T_g$ is the glass transition temperature of miscible polymer blends, $w_1$ is the weight fraction of first polymer of the blends, $T_g^1$ is the glass transition temperature of first polymer of the blends, $w_2$ is the weight fraction of second polymer of the blends, $T_g^2$ is the glass transition temperature of second polymer of the blends.

Selected samples were also injection molded at a set temperature of 360-400° C., and mold temperature of 150-230° C. using a 30-60 seconds cycle time. Modulus-temperature properties were measured using Dynamic Mechanical Analyzer (DMA). The DMA analysis using TA Instrument Q800 DMA machine was run in single cantilever mode on 3.2 mm bars with 3° C./min heating rate with an oscillatory frequency of 1 Hertz. Samples were heated 3° C./min from 50° C. to 300° C. to record modulus (E')-temperature and tan δ-temperature curves. Tan δ is derived from storage modulus (E') and loss modulus (E") E"/E' and the peak temperature of tan δ correlates to the glass transition temperature of the blends.

Materials

PEKK is poly(ether ketone ketone) sold by Cytec as CYPEK® HT.

PEEK is poly(ether ether ketone) sold by Evonik as VESTAKEEP® 4000G.

PEK is poly(ether ketone) sold by Victrex Ltd as Victrex® PEEK-HT™ G22.

PBI is polybenzimidazole sold by PBI Performance Polymers as CELAZOLE® PBI U60.

Loom PEI is poly(etherimide) sold by SABIC Innovative Plastics as ULTEM® 1000 and ULTEM® XH6050.

PPSU is poly(aryl sulfone) sold by Solvay Advanced Polymers LLC as RADEL® R5000

PPS is poly(phenylene sulfide) sold by Ticona as FORTRON® 0320.

PAEKP-1 is an amorphous poly(aryl ether ketone phthalazinone) made by reaction of 4,4'-difluorobenzophenone with about an equal molar amount of (4-hydroxyphenyl) phthalazin-1(2H)-one (phthalazinone), as described herein.

To a two liter three-neck round-bottomed flask, equipped with a nitrogen inlet, thermocouple, mechanical stirrer, Dean-Stark trap and condenser, diphenyl sulfone (574.21 grams) was charged. 152.7 grams (0.70 mol) of dried 4,4'-difluorobenzophenone, 166.8 grams (0.70 mol) of dried phthalazinone monomer, and 102.55 grams (0.74 mol) of anhydrous potassium carbonate were then added. The reaction medium was heated to 170° C., and maintained for two hours. The reaction mixture was then heated to 240° C. and maintained for 2.5 hours. The reaction was terminated, and the mixture was precipitated in de-ionized water. The cooled solid was ground to fine particles less than about 60 mesh.

The fine particles were placed into a 4 liter flask with 2000 ml acetone, heated under reflux for one hour, and then filtered. This process was repeated five times to remove diphenylsulfone. The resulting powder material was then placed into a 4 liter flask with 2000 ml de-ionized water, heated under reflux for one hour, and then filtered. This process was repeated five times to remove inorganic salts.

The resulting solid polymer was then dried at 120° C. under vacuum overnight. The white polymer had an inherent viscosity (IV) of about 0.3 (0.1 g/dL solution of the polymer in 98% sulfuric acid at 30° C.), a glass transition temperature of about 257° C.

PAEKP-2 is a semicrystalline poly(aryl ether ketone phthalazinone), as described herein, made by reaction of a mixture of about 70 mol % (4-hydroxyphenyl)phthalazin-1 (2H)-one (phthalazinone) and about 30 mol % 4,4'-biphenol with about an equal molar amount of 4,4'-difluorobenzophenone following similar procedure for PAEKP-1 in a 300 liter reactor. PAEKP-2 has a glass transition temperature of 230° C., a melting peak temperature of 320° C. and an inherent viscosity of 0.8 dL/g at 30° C. in 98% sulfuric acid.

Thermal properties of various PAEKP blends were presented in the following examples, including projected $T_g$ using Mixture Rule. Dynamic mechanical transitions of selected blend samples were also obtained.

Example 1

Polymer Blend of PEKK with PAEKP-1

PEKK (60 wt %) was blended with PAEKP-1 (40 wt %) in a ⅝" diameter single screw extruder with L/D=24/1 at 380° C. The extrudate was chopped into pellets. The pelletized product was analyzed by DSC, and its thermal properties are shown in Table 1 together with the thermal properties of the unblended components. A single glass transition temperature was detected having a middle point temperature of 186° C., although lower than the theoretical $T_g$ (194° C.) of this polymer blend assuming full miscibility, indicating good miscibility between the two polymers at the given proportion (60/40).

TABLE 1

| Property | PEKK | PAEKP-1 | Example 1 | Projected $T_g$ |
|---|---|---|---|---|
| $T_g$ (° C.) | 160 | 257 | 186 | 194 |
| $T_{cc}$ (° C.) | 311 | — | 264 | — |
| $T_m$ (° C.) | 361 | — | 346 | — |

Example 2

Polymer Blend of PEEK with PAEKP-1

PEKK (60 wt %) was blended with PAEKP-1 (40 wt %) in a single screw ⅝" diameter extruder with L/D=24/1 at 380° C. The extrudate was chopped into pellets. The pelletized product was analyzed by DSC, and its thermal properties are shown in Table 2 together with the thermal properties of the unblended components. A single glass transition temperature was detected having a middle point temperature of 174° C., although lower than the theoretical $T_g$ (182° C.) of this polymer blend assuming full miscibility, indicating good miscibility between the two polymers at the given proportion (60/40).

TABLE 2

| Property | PEEK | PAEKP-1 | Example 2 | Projected $T_g$ |
|---|---|---|---|---|
| $T_g$ (° C.) | 143 | 257 | 174 | 182 |
| $T_{cc}$ (° C.) | 297 | — | 235 | — |
| $T_m$ (° C.) | 334 | — | 329 | — |

Examples 3, 4, 5 and 6

Polymer Blends of PEKK with PAEKP-2

In a ⅝" diameter single screw extruder with L/D=24/1 at 380° C. PEKK (20 to 80 wt %) was blended with PAEKP-2 (80 to 20 wt %) The extrudate was chopped into pellets. The pelletized product was analyzed by DSC, and its thermal properties are shown in Table 3 together with the thermal properties of the unblended components. Single glass transition temperatures were detected for all polymer blends. The $T_g$'s of the polymer blends are very close to the theoretical $T_g$'s of the polymer blends from Fox equation assuming full miscibility, indicating excellent miscibility between the two polymers at the given proportions (80/20 to 20/80).

TABLE 3

| Property | PEKK/PAEKP-2 Weight Ratio | $T_g$ (° C.) | Projected Tg | $T_{cc}$ (° C.) | $T_m$ (° C.) |
|---|---|---|---|---|---|
| PEKK | 100/0 | 160 | — | 311 | 361 |
| Example 3 | 80/20 | 177 | 172 | 288 | 360 |

TABLE 3-continued

| Property | PEKK/PAEKP-2 Weight Ratio | $T_g$ (° C.) | Projected Tg | $T_{cc}$ (° C.) | $T_m$ (° C.) |
|---|---|---|---|---|---|
| Example 4 | 60/40 | 187 | 186 | 268 | 358 |
| Example 5 | 40/60 | 204 | 199 | — | 353 |
| Example 6 | 20/80 | 210 | 214 | — | 354 |
| PAEKP-2 | 0/100 | 230 | — | — | 320 |

Figure 2:
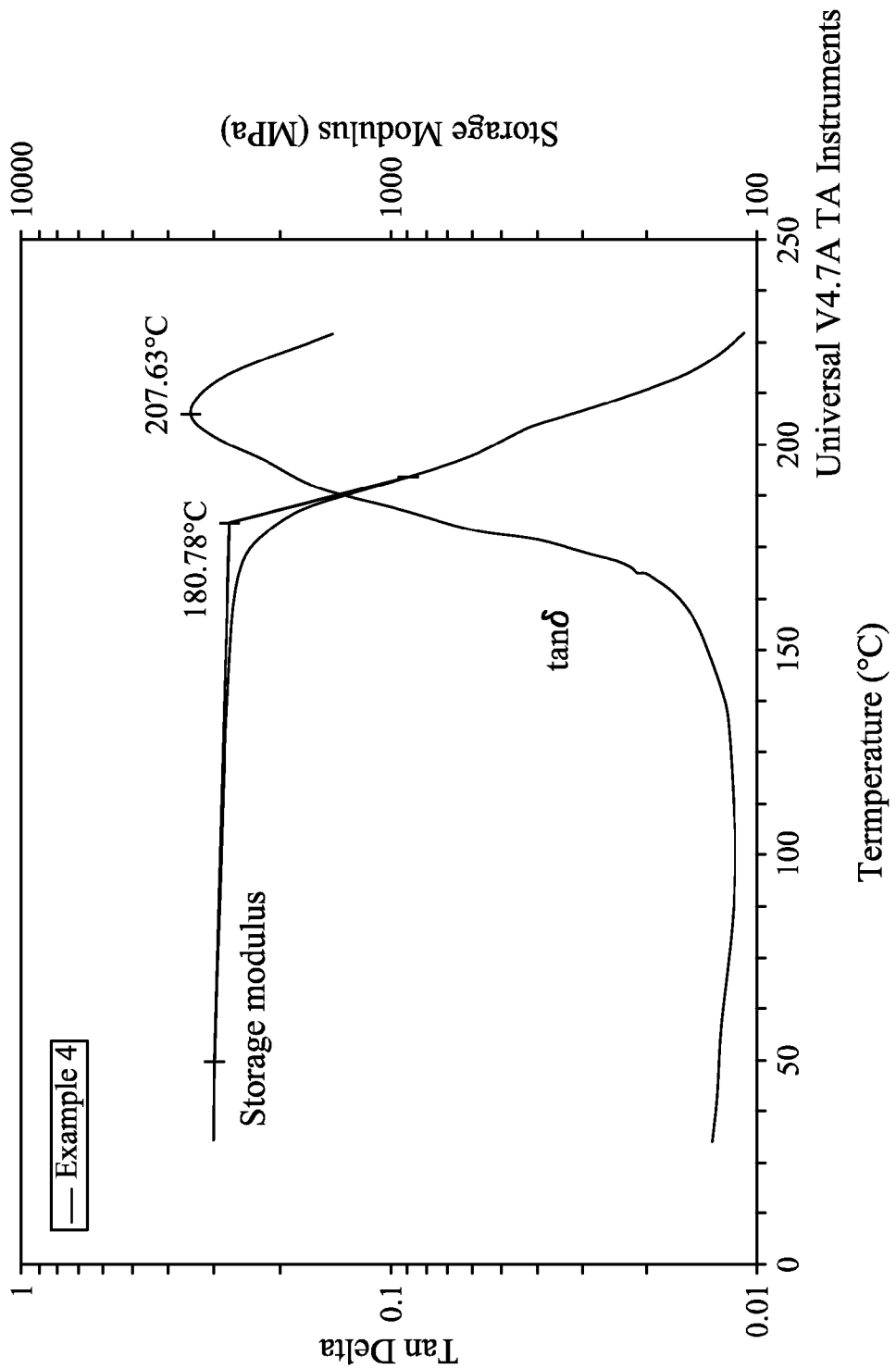
FIG. 2 depicts the storage modulus and tan δ-temperature curves of Example 4, in accordance with embodiments of the present invention.

FIG. 2 shows the storage modulus-temperature and tan δ-temperature curves of Example 4. There is only one peak at 207° C. in the tan δ-temperature curve indicating single glass transition temperature for this blend. The onset temperature for storage modulus drop is at about 181° C. indicating improvement of load-bearing capability of the blend.

Example 7

Polymer Blends of PEEK with PAEKP-2

PEEK (60 wt %) was blended with PAEKP-2 (40 wt %) in a 26 mm diameter twin screw extruder with L/D=44/1 at 380° C. The extrudate was chopped into pellets. The pelletized product was analyzed by DSC, and its thermal properties are shown in Table 4 together with the thermal properties of the unblended components. A single glass transition temperature was detected having a middle point temperature of 176° C. that is very close to the theoretical $T_g$ (174° C.) of the polymer blend from Fox equation assuming full miscibility, indicating miscibility between the two polymers at the given proportion (60/40).

TABLE 4

| Property | PEEK | PAEKP-2 | Example 7 | Projected $T_g$ |
|---|---|---|---|---|
| $T_g$ (° C.) | 143 | 230 | 176 | 174 |
| $T_{cc}$ (° C.) | 297 | — | 259 | — |
| $T_m$ (° C.) | 334 | 320 | 332 | — |

Figure 3:
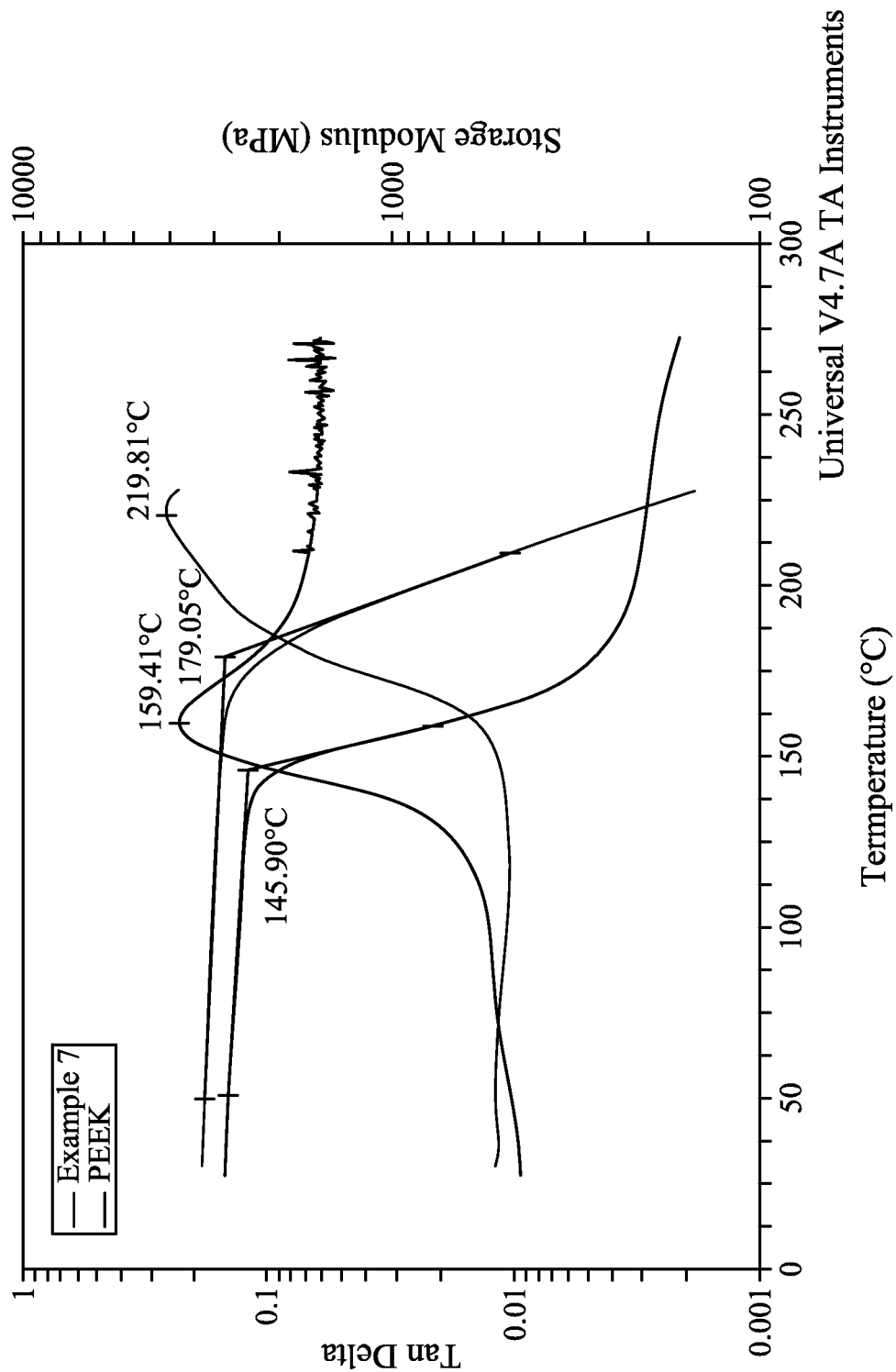
FIG. 3 depicts the storage modulus and tan δ-temperature curves of PEEK and Example 7, in accordance with embodiments of the present invention.

FIG. 3 shows the storage modulus-temperature and tan δ-temperature curves of PEEK and Example 7. There is only one peak in the tan δ-temperature curve indicating single glass transition temperature for this blend. The onset temperature of storage modulus drop for the blend is at 179° C. that is 30° C. higher than that (146° C.) of PEEK, indicating significant improvement of load-bearing capability for this blend.

Examples 8

Polymer Blend of PEK with PAEKP-2

PEK (60 wt %) was blended with PAEKP-2 (40 wt %) in a 26 mm diameter twin screw extruder with L/D=44/1 at 380° C. The extrudate was chopped into pellets. The pelletized product was analyzed by DSC, and its thermal properties are shown in Table together with the thermal properties of the unblended components. A single glass transition temperature was detected having a middle point temperature of 193° C. that is close to the theoretical $T_g$ (184° C.) of the polymer blend from Fox equation assuming full miscibility, indicating good miscibility between the two polymers at the given proportion (60/40).

TABLE 5

| Property | PEK | PAEKP-2 | Example 8 | Projected $T_g$ |
|---|---|---|---|---|
| $T_g$ (° C.) | 158 | 230 | 193 | 184 |
| $T_{cc}$ (° C.) | 330 | — | 294 | — |
| $T_m$ (° C.) | 373 | 320 | 363 | — |

Figure 4:
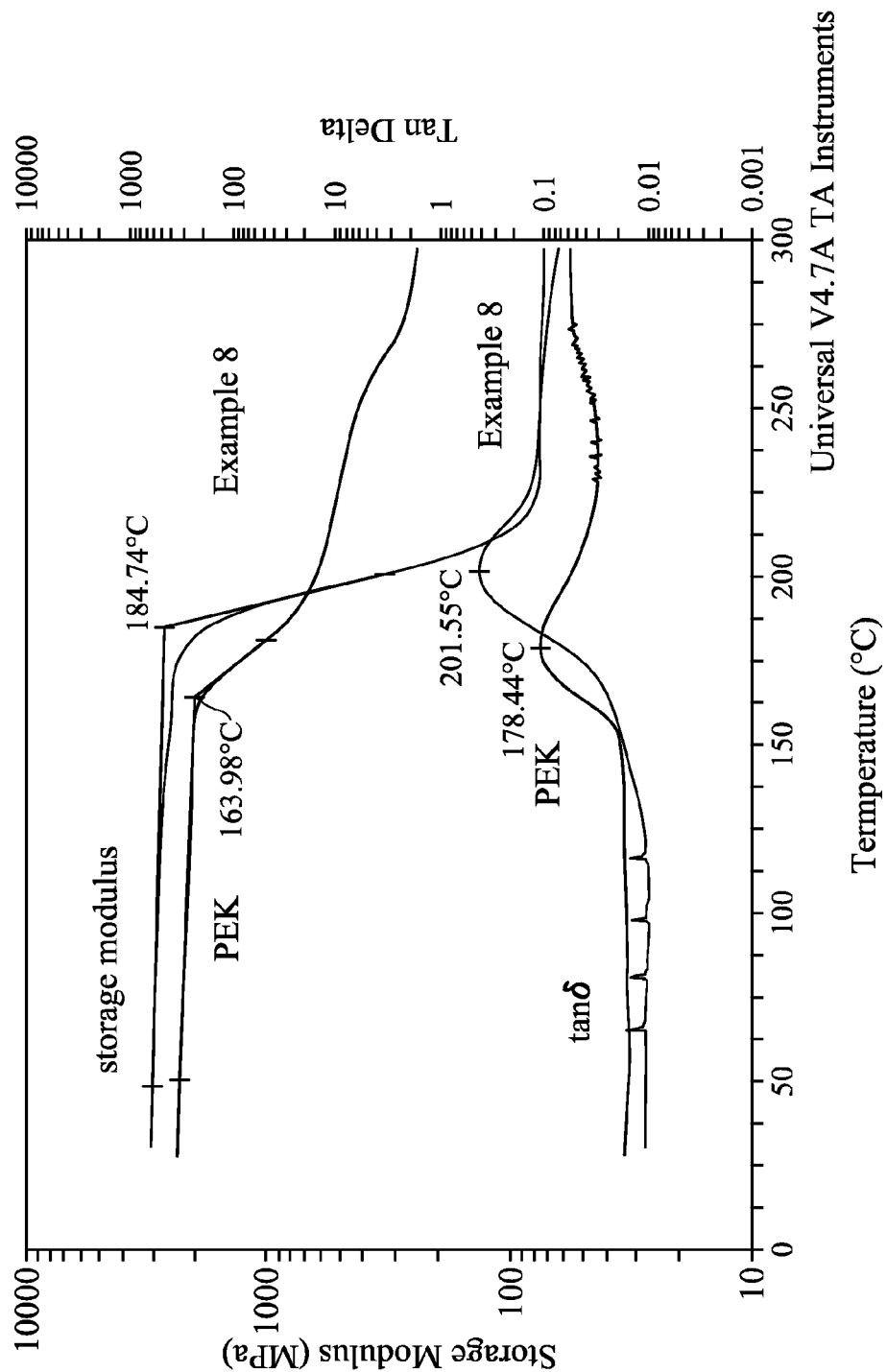
FIG. 4 depicts the storage modulus-temperature and tan δ-temperature curves of PEK and Example 8, in accordance with embodiments of the present invention.

FIG. 4 shows the storage modulus-temperature and tan δ-temperature curves of PEK and Example 8. There is only one peak at 201° C. in the tan δ-temperature curve indicating single glass transition temperature for this blend. The onset temperature of storage modulus drop for the blend is at 185° C. that is higher than that (164° C.) of PEK, indicating significant improvement of load-bearing capability for this blend.

Examples 9 and 10

Polymer Blends of PBI with PAEKP-2

PAEKP-2 (60-90 wt %) was blended with PBI U60 (10-40 wt %) in a 26 mm diameter twin screw extruder with L/D=44/1 at a melt temperature about 440° C. The extrudate was chopped into pellets. The pelletized product was analyzed by DSC, and its thermal properties are shown in Table 6 together with the thermal properties of the unblended components.

Example 11

Polymer Blend of PBI with PAEKP-2

PAEKP-2 (20 wt %) was blended with PBI U60 (80 wt %) in powder form and then compression molded at 400-450° C. into a disc. Cut sample from the disc was analyzed by DSC, and its thermal properties are shown in Table 6 together with the thermal properties of the unblended components.

Figure 5:
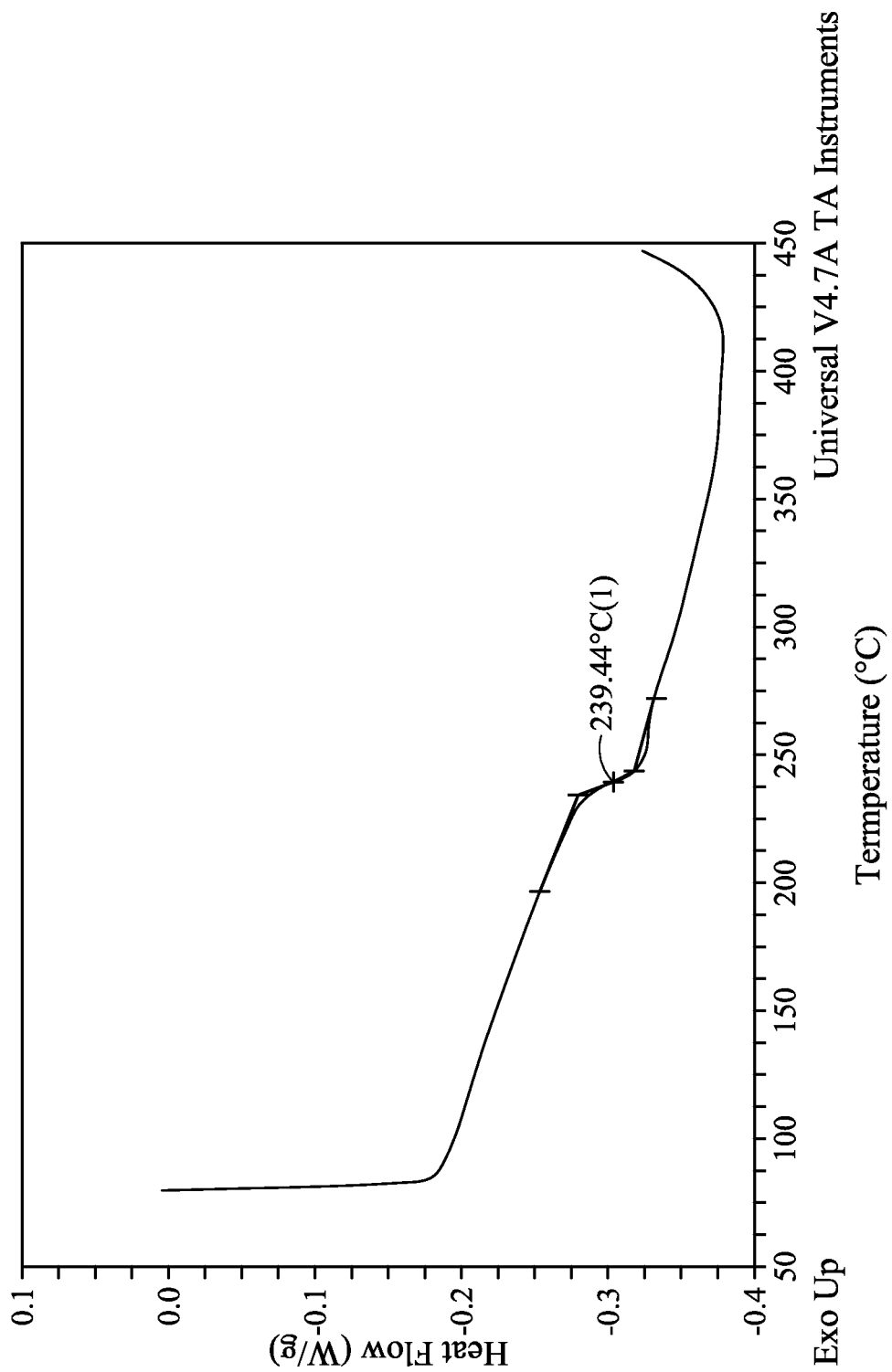
FIG. 5 depicts the DSC curve of Example 9, in accordance with embodiments of the present invention.
Figure 6:
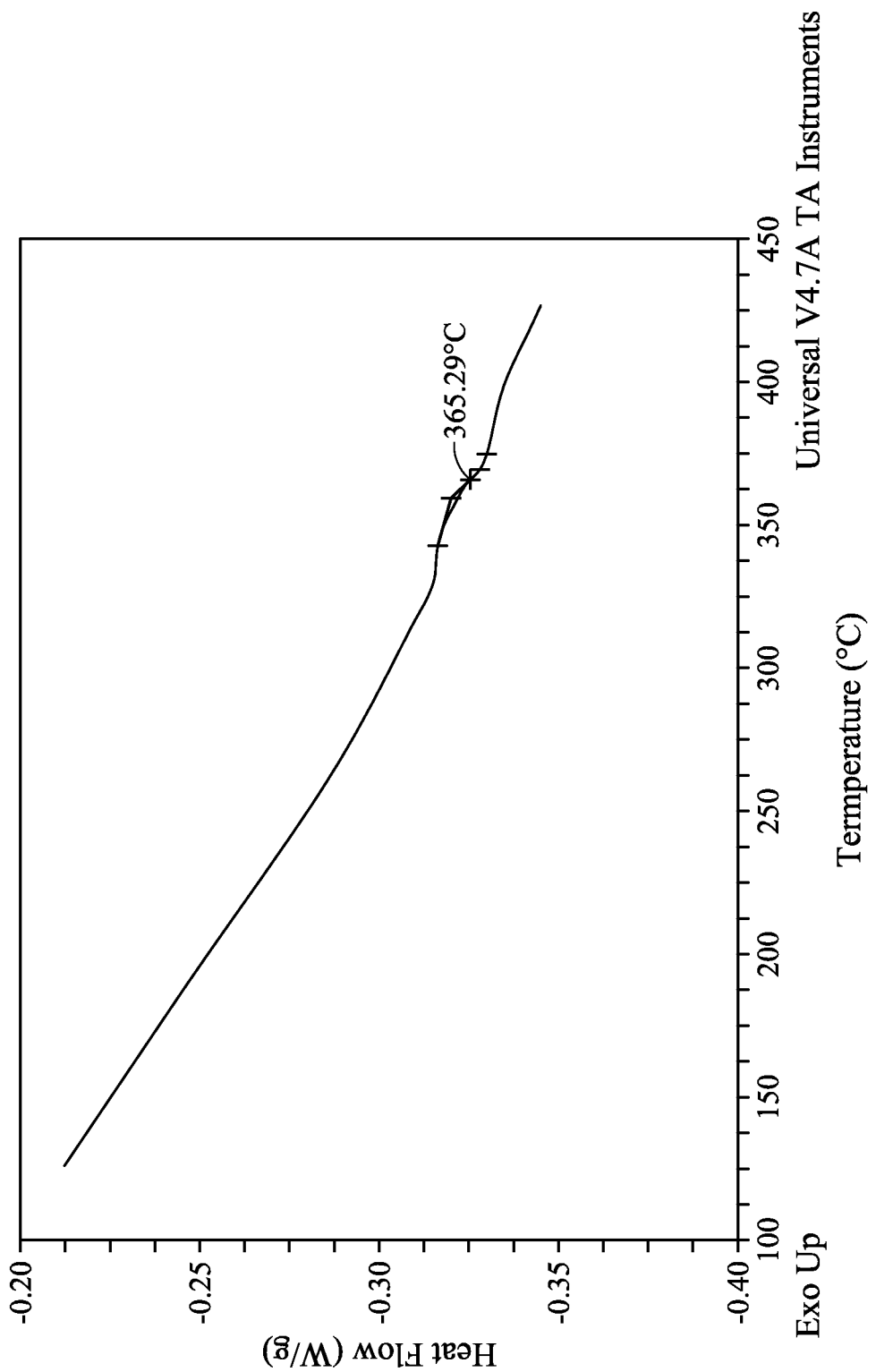
FIG. 6 depicts the DSC curve of Example 11, in accordance with embodiments of the present invention.

FIG. 5 shows the DSC curve of Example 9 and FIG. 6 shows the DSC curve of Example 11. Both DSC curves show single glass transition temperatures for Example 9 and Example 11. The $T_g$'s of the polymer blends are very close to the theoretical $T_g$'s of the polymer blends from Fox equation assuming full miscibility, indicating good miscibility between the two polymers at the given proportions (90/10 to 20/80).

TABLE 6

| Property | PAEKP-2/PBI U60 Weight Ratio | $T_g$ (° C.) | Projected $T_g$ | $T_m$ (° C.) |
|---|---|---|---|---|
| PAEKP-2 | 100/0 | 230 | — | 320 |
| Example 9 | 90/10 | 239 | 244 | — |
| Example 10 | 60/40 | 300 | 293 | — |
| Example 11 | 20/80 | 365 | 375 | — |
| PBI U60 | 0/100 | 425 | — | — |

Examples 12

Polymer Blend of PEI ULTEM®1000 with PAEKP-2

PEI ULTEM® 000 (50 wt %) was blended with PAEKP-2 (50 wt %) in a ⅝" diameter single screw extruder with L/D=24/1 at 380° C. The extrudate was chopped into pellets. The pelletized product was analyzed by DSC, and its thermal properties are shown in Table 7 together with the thermal properties of the unblended components. A single glass transition temperature was detected having a middle point temperature of 222° C. that is very close to the theoretical $T_g$ (223° C.) of this polymer blend from Fox equation assuming full miscibility, indicating excellent miscibility between the two polymers at the given proportion (50/50).

TABLE 7

| Property | PEI ULTEM® 1000 | PAEKP-2 | Example 12 | Projected $T_g$ |
|---|---|---|---|---|
| $T_g$ (° C.) | 217 | 230 | 222 | 223 |
| Tm (° C.) | — | 320 | — | — |

Examples 13

Polymer Blend of ULTEM® XH6050 with PAEKP-2

ULTEM® XH6050 (50 wt %) was blended with PAEKP-2 (50 wt %) in a 26 mm diameter twin screw extruder with L/D=44/1 at 380° C. The extrudate was chopped into pellets. The pelletized product was analyzed by DSC, and its thermal properties are shown in Table 8 together with the thermal properties of the unblended components. A single glass transition temperature was detected having a middle point temperature of 235° C. that is very close to the theoretical $T_g$ (238° C.) of this polymer blend from Fox equation assuming full miscibility, indicating good miscibility between the two polymers at the given proportion (50/50).

TABLE 8

| Property | PEI ULTEM® XH6050 | PAEKP-2 | Example 13 | Projected $T_g$ |
|---|---|---|---|---|
| $T_g$ (° C.) | 247 | 230 | 235 | 238 |

Figure 7:
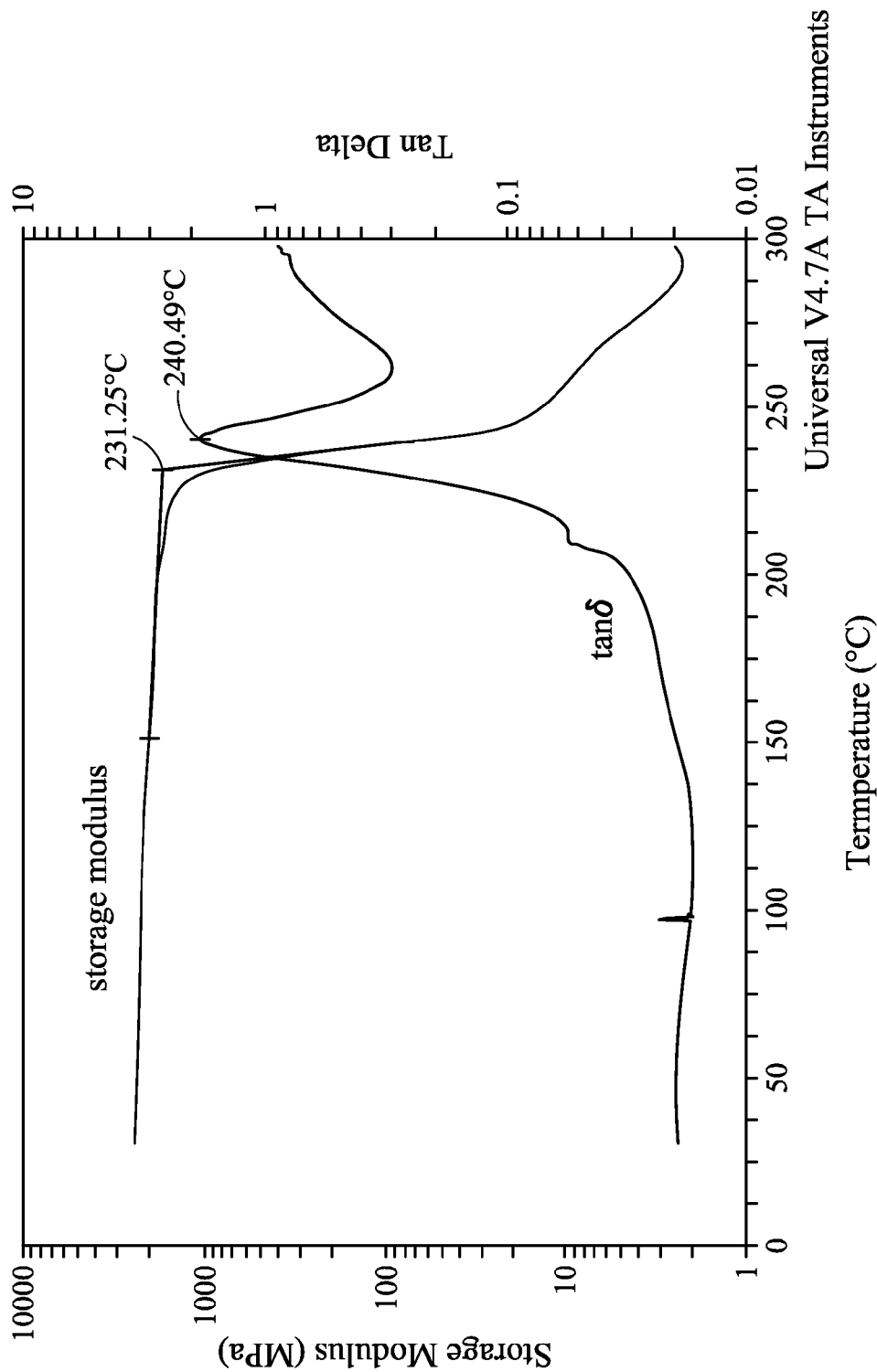
FIG. 7 depicts the storage modulus-temperature and tan δ-temperature curves of Example 13, in accordance with embodiments of the present invention.

FIG. 7 shows the storage modulus-temperature and tan δ-temperature curves of Example 13. There is only one peak at 240° C. in the tan δ-temperature curve indicating single glass transition temperature for this blend.

Examples 14

Polymer Blend of PPSU with PAEKP-2

PPSU (RADEL® 5000) (50 wt %) was blended with PAEKP-2 (50 wt %) in a 26 mm diameter twin screw extruder with L/D=44/1 at 380° C. The extrudate was chopped into pellets. The pelletized product was analyzed by DSC, and its thermal properties are shown in Table 9 together with the thermal properties of the unblended components. A single glass transition temperature was detected having a middle point temperature of 224° C. that is very close to the theoretical $T_g$ (225° C.) of this polymer blends from Fox equation assuming full miscibility, indicating excellent miscibility between the two polymers at the given proportion (60/40).

TABLE 9

| Property | PPSU RADEL® 5000 | PAEKP-2 | Example 14 | Projected $T_g$ |
|---|---|---|---|---|
| $T_g$ (° C.) | 220 | 230 | 224 | 225 |
| Tm (° C.) | — | 320 | — | — |

Examples 15

Polymer Blend of PPS with PAEKP-2

PPS (FORTRON® 0320) (25 to 75 wt %) was blended with PAEKP-2 (25 to 75 wt %) in a 26 mm diameter twin screw extruder with L/D=44/1 at 360° C. The extrudate was chopped into pellets. The pelletized product was analyzed by DSC, and its thermal properties are shown in Table 10 together with the thermal properties of the unblended components.

TABLE 10

| Property | PPS/PAEKP-2 Weight Ratio | $T_g$ (° C.) | $T_g^1$ (° C.) | $T_g^2$ (° C.) | Projected $T_g$ | $T_m$ (° C.) |
|---|---|---|---|---|---|---|
| PPS | 100/0 | 90 | — | — | — | 285 |
| Example 15 | 75/25 | | 108 | 211 | 126 | 275 |
| Example 16 | 50/50 | | 109 | 217 | 155 | 275 |
| Example 17 | 25/75 | | ND | 216 | 190 | 274 |
| PAEKP-2 | 0/100 | 230 | — | — | — | 320 |

Two glass transition temperatures were detected having a middle point temperature of about 108-109° C. and about 211-217° C. for the polymer blends. The $T_g$'s are very different from the theoretical $T_g$'s (126 to 190° C.) of the polymer blends from Fox equation assuming full miscibility, indicating incomplete miscibility between the two polymers at the given proportions (75/25 to 25/75). However, the lower $T_g$'s (108-109° C.) of the polymer blends are significantly higher than that (90° C.) of PPS component, and the upper $T_g$'s (211-217° C.) of the polymer blends are significantly lower than that (230° C.) of PAEKP-2 component, indicating that some degree of miscibility was present.

Figure 8:
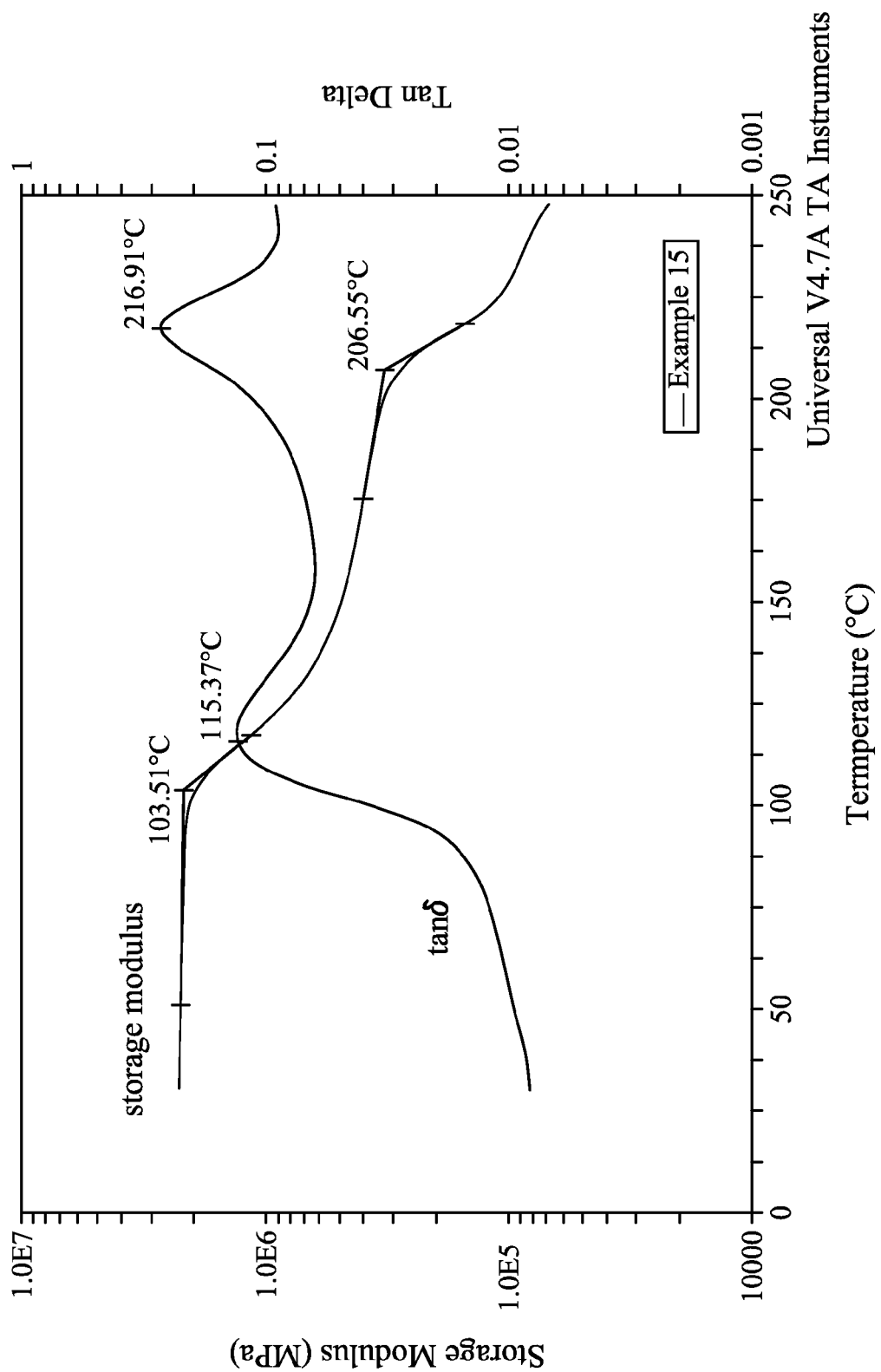
FIG. 8 depicts the storage modulus-temperature and tan δ-temperature curves of Example 15, in accordance with embodiments of the present invention.

FIG. 8 shows the storage modulus-temperature and tan δ-temperature curves of Example 15.

There are two peaks (at 115° C. and 217° C.) in the tan δ-temperature curve indicating two glass transition temperatures for this partially miscible blend.

The foregoing description of the embodiments of this invention has been presented for purposes of illustration and description. It is not intended to be exhaustive or to limit the invention to the precise form disclosed, and obviously, many modifications and variations are possible.

We claim:
1. A composition, comprising:
   a) a first polymer blend comprising a polymer selected from the group consisting of poly(aryl ether ketone phthalazinone)s and combinations thereof; and
   b) a second polymer blend comprising a polymer selected from the group consisting of poly(aryl ether ketone)s, thermoplastic polyimides, poly(aryl ether sulfone)s, polybenzimidazoles, poly(phenylene sulfide)s and combinations thereof,
   wherein said first polymer blend is miscible or partially miscible in the second polymer blend, and
   wherein a miscible blend of the first and second polymer blends is characterized by a single glass transition temperature and a partially miscible blend of the first and second polymer blends is characterized by more than one glass transition temperature ($T_g$).
2. A composition, comprising:
   a) about 1 part by weight to about 99 parts by weight of a first polymer component selected from the group consisting of poly(aryl ether ketone phthalazinone)s and mixtures thereof; and c) about 1 part by weight to about 99 parts by weight of a second polymer component selected from the group consisting of poly(aryl ether ketone)s, thermoplastic polyimides, poly(aryl ether sulfone)s, polybenzimidazoles, poly(phenylene sulfide)s and mixtures thereof,
wherein said first polymer blend is miscible or partially miscible in the second polymer blend, and
wherein a miscible blend of the first and second polymer blends is characterized by a single glass transition temperature and a partially miscible blend of the first and second polymer blends is characterized by more than one glass transition temperature ($T_g$).

3. The composition of claim 1, wherein said composition does not undergo delamination.

4. The composition of claim 1, wherein the first polymer is a poly(aryl ether) formula, (I):

(I)

wherein $0.01 \le y \le 1.00$ and $x+y=1$, and Cp is a phthalazinone radical having the formula (II):

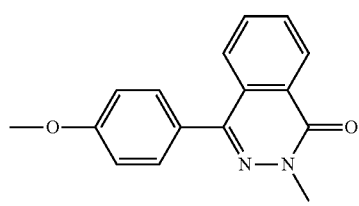
(II)

Q is a Bisphenol radical having the formula (III):

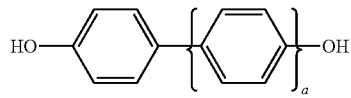
(III)

a is equal to 0 or 1 in formula (III)
Z is a bisphenylketone radical having the formula (IV):

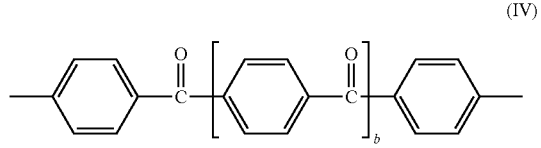
(IV)

b is equal to 0 or 1 in formula (IV) or
a biphenyldiketone radical having the formula (V):

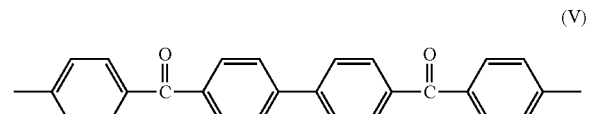
(V)

wherein n is an integer such that the inherent viscosity is at least about 0.3 dL/g in 98% sulfuric acid at 30° C.

5. The composition of claim 1, wherein the first polymer is poly(aryl ether ketone phthalazinone) homopolymer, having the following formula:

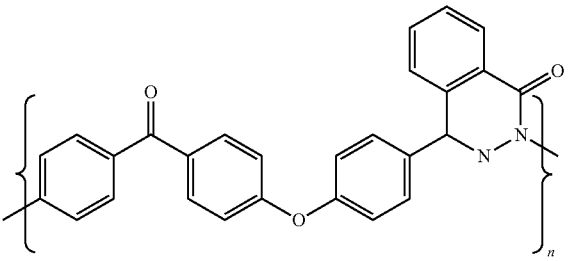

wherein n is an integer such that the inherent viscosity is at least about 0.2 dL/g in 98% sulfuric acid at 30° C.

6. The composition of claim 1, wherein the second polymer is a polybenzimidazole, having of the following formula:

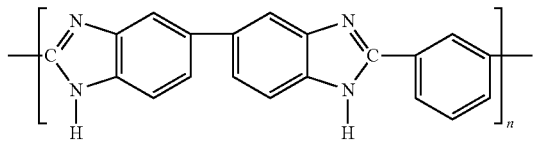

wherein n is an integer such that the inherent viscosity is at least about 0.2 dL/g in dimethylformamide at 25° C., and
wherein the polybenzimidazole is miscible with the first polymer and the blend has a single $T_g$ and single $T_m$.

7. The composition of claim 1, wherein the first polymer blend is PAEKP-2 in the amount of 80 weight percent of the composition) and the second polymer blend is polybenzimidazole in the amount of 20 weight percent of the composition, and the improved melt processability is characterized by $T_g$ of 283° C.

8. The composition of claim 1, wherein the first polymer blend is PAEKP-2 in the amount of 60 weight percent of the composition and the second polymer blend is polybenzimidazole in the amount of 40 weight percent of the composition, and the improved melt processability is characterized by $T_g$ of 300° C.

9. The composition of claim 1, wherein the first polymer blend is PAEKP-2 in the amount of 20 weight percent of the composition and the second polymer blend is polybenzimidazole in the amount of 80 weight percent of the composition, and the improved melt processability is characterized by $T_g$ of 365° C.

10. The composition of claim 1, wherein the poly(aryl ether ketone phthalazinone) is a copolymer, having the following formula:

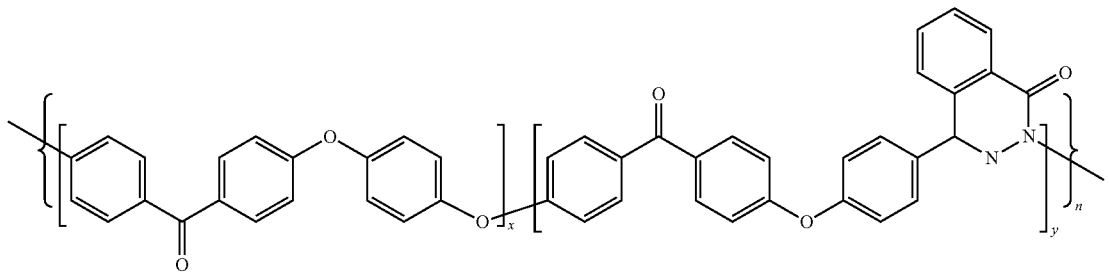

wherein 0.01 ≤ x ≤ 0.99 and x+y=1, and n is an integer such that the inherent viscosity is at least about 0.3 dL/g in 98% sulfuric acid at 30° C.

11. The composition of claim 1, wherein the poly(aryl ether ketone phthalazinone) is a copolymer, having the following formula:

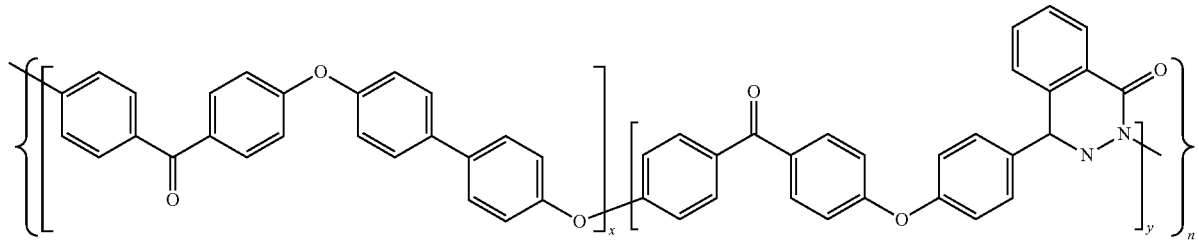

wherein 0.01 ≤ x ≤ 0.99 and x+y=1, and n is an integer such that the inherent viscosity is at least about 0.3 dL/g in 98% sulfuric acid at 30° C.

12. The composition of claim 1, wherein the poly(aryl ether ketone phthalazinone) has a glass transition temperature ($T_g$) from about 160 to 257° C.

13. An article made from the composition of claim 1.

14. The article of claim 13, wherein the article is selected from the group consisting of sheets, films, multilayer sheets, multilayer films, molded parts, extruded profiles, fibers, coated parts, tubing, composites and foams.

15. A high temperature thermoplastic composition comprising a polymer blend, wherein the polymer blend is derived from mixing at least one poly(aryl ether ketone phthalazinone) and a polymer selected from the group consisting of a poly(aryl ether ketone), a polybenzimidazole, a thermoplastic polyimide, a poly(aryl ether sulfone), a poly(phenylene sulfide), and combinations thereof, wherein said composition exhibits miscibility or partial miscibility.

16. The thermoplastic composition of claim 15, wherein the poly(aryl ether ketone phthalazinone) having the following formula (I):

 (I)

wherein 0.01 ≤ y ≤ 1.00 and x+y=1, and Cp is a phthalazinone radical of formula (II),

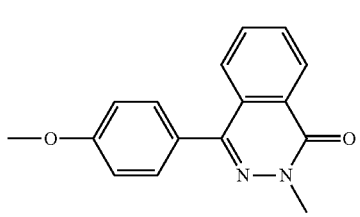 (II)

Q is a Bisphenol radical of formula (III):

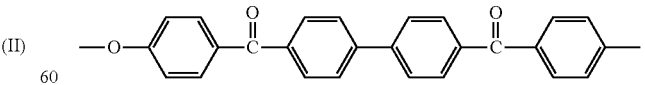 (III)

a is equal to 0 or 1 in formula (III)

Z is a bisphenylketone radical of formula (IV)

(IV)

b is equal to 0 or 1 in formula (IV) or a biphenyldiketone radical of formula (V)

(V)

wherein n is an integer such that the inherent viscosity is at least about 0.3 dL/g in 98% sulfuric acid at 30° C.

17. The composition of claim 15, wherein the poly(aryl ether ketone phthalazinone) is a homopolymer, having the following formula:

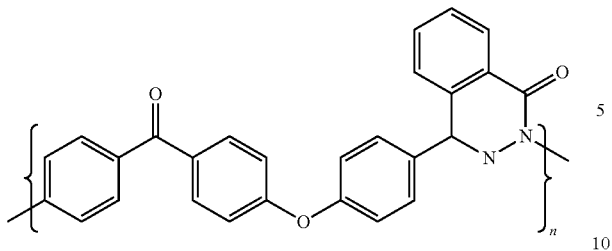

wherein n is an integer such that the inherent viscosity is at least about 0.2 dL/g in 98% sulfuric acid at 30° C.

18. The composition of claim 15, wherein the poly(aryl ether ketone phthalazinone) is a copolymer, having the following formula:

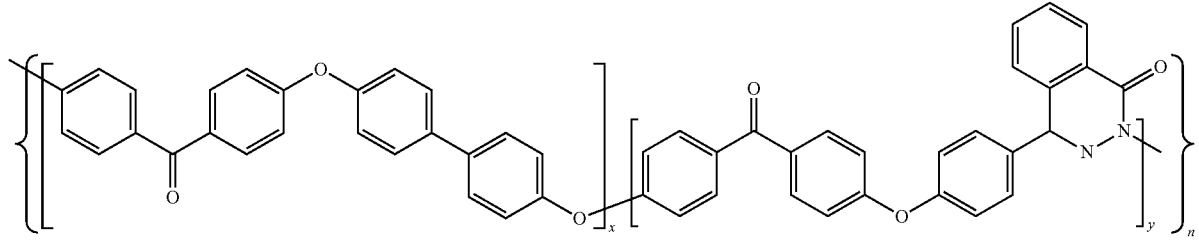

wherein $0.01 \leq x \leq 0.99$ and $x+y=1$, and n is an integer such that the inherent viscosity is at least about 0.3 dL/g in 98% sulfuric acid at 30° C.

19. The composition of claim 15, wherein the poly(aryl ether ketone phthalazinone) has a glass transition temperature from about 160 to 257° C.

20. An article made from the composition of claim 15.

21. The article of claim 20, wherein the article is selected from the group consisting of sheets, films, multilayer sheets, multilayer films, molded parts, extruded profiles, fibers, coated parts, tubing, composites and foams.

22. The composition of claim 15, wherein the composition has an improved load bearing capability or an improved melt processability.

\* \* \* \* \*